United States Patent
Kubota et al.

(10) Patent No.: US 10,114,197 B2
(45) Date of Patent: Oct. 30, 2018

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignee: KANTATSU CO., LTD., Tochigi (JP)

( * ) Notice: Subject to any disclaimer, the term of this patent is extended or adjusted under 35 U.S.C. 154(b) by 1 day.

(21) Appl. No.: 15/240,049

(22) Filed: Aug. 18, 2016

(65) Prior Publication Data

US 2016/0370560 A1    Dec. 22, 2016

Related U.S. Application Data

(63) Continuation of application No. 14/501,225, filed on Sep. 30, 2014, now Pat. No. 9,448,386.

(30) Foreign Application Priority Data

Jan. 10, 2014 (JP) ................................. 2014-002858

(51) Int. Cl.
| | |
|---|---|
| G02B 15/177 | (2006.01) |
| G02B 13/00 | (2006.01) |
| G02B 9/64 | (2006.01) |
| G02B 5/00 | (2006.01) |
| G02B 27/00 | (2006.01) |

(52) U.S. Cl.
CPC ......... *G02B 13/0045* (2013.01); *G02B 5/005* (2013.01); *G02B 9/64* (2013.01); *G02B 27/0025* (2013.01)

(58) Field of Classification Search
CPC .......................... G02B 13/001; G02B 13/0045
USPC ................................................. 359/708–718
See application file for complete search history.

(56) References Cited

U.S. PATENT DOCUMENTS

| | | | |
|---|---|---|---|
| 2014/0139719 A1 | 5/2014 | Fukaya | |
| 2015/0103414 A1* | 4/2015 | Baik ....................... | G02B 9/64 |
| | | | 359/708 |

FOREIGN PATENT DOCUMENTS

JP        2012-155223 A        8/2012

* cited by examiner

*Primary Examiner* — Robert E Tallman
(74) *Attorney, Agent, or Firm* — Kubotera & Associates, LLC

(57) ABSTRACT

An imaging lens includes a first lens group; a second lens group; and a third lens group, arranged in this order from an object side to an image plane side. The first lens group includes a first lens having positive refractive power, a second lens having negative refractive power, and a third lens. The second lens group includes a fourth lens and a fifth lens. The third lens group includes a sixth lens and a seventh lens having negative refractive power. The fourth lens has a concave surface facing the object side near an optical axis thereof. The seventh lens has an image plane-side surface formed in an aspheric shape having at least one inflexion point. The fifth lens is disposed away from the sixth lens by a specific distance on an optical axis thereof. The first to third lenses have specific Abbe's numbers.

18 Claims, 18 Drawing Sheets

IMAGING LENS

CROSS-REFERENCE TO RELATED APPLICATIONS

This is a continuation application of a prior application Ser. No. 14/501,225, filed on Sep. 30, 2014, allowed, which claims priority of Japanese Patent Application No. 2014-002858, filed on Jan. 10, 2014.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable to be mounted in a relatively small camera such as a camera to be built in a portable device including a cellular phone and a portable informational terminal, a digital still camera, a security camera, a vehicle onboard camera, and a network camera.

In these years, in place of cellular phones intended mainly for making phone calls, so-called smartphones, i.e., cellular phones with functions of portable information terminals (PDAs) and/or personal computers, have been more widely used. Since the smartphones generally are highly functional as opposed to the cellular phones, it is possible to use images taken by a camera thereof in various applications.

Generally speaking, product groups of cellular phones and smartphones are often composed according to specifications for beginners to advanced users. Among them, an imaging lens to be mounted in the products designed for advanced users is required to have a high-resolution lens configuration so as to be also applicable to a high pixel count imaging element developed in these years.

As a method of attaining a high-resolution imaging lens, there is a method of increasing the number of lenses that compose the imaging lens. However, the increase of the number of lenses easily causes an increase in the size of the imaging lens, so that the lens configuration having a large number of lenses is disadvantageous to be mounted in a small-sized camera such as the above-described cellular phones and smartphones. For this reason, the imaging lens has been developed so as to restrain the number of lenses as small as possible. However, with rapid advancement in these days for achieving a higher pixel count of an imaging element, an imaging lens has been developed so as to attain higher resolution rather than a shorter total track length of the imaging lens. As an example, there is an advent of a camera unit formed to be able to obtain an image that is equivalent to that of a digital still camera by attaching the camera unit to a cellular phone or a smartphone, which is different from a conventional camera unit containing an imaging lens and an imaging element to be mounted inside a cellular phone or a smartphone.

In case of a lens configuration composed of seven lenses, since the number of lenses that compose an imaging lens is large, it is somewhat disadvantageous for downsizing of the imaging lens. However, since there is high flexibility in designing, it has potential of attaining satisfactory correction of aberrations and downsizing in a balanced manner. For example, as a lens configuration composed of seven lenses, an imaging lens described in Patent Reference has been known.

Patent Reference: Japanese Patent Application Publication No. 2012-155223

The imaging lens described in Patent Reference includes a first lens having a biconvex shape; a second lens that is joined to the first lens and has a biconcave shape; a third lens that is negative and has a shape of a meniscus lens directing a convex surface thereof to an object side; a fourth lens that is positive and has a shape of a meniscus lens directing a concave surface thereof to the object side; a fifth lens that is negative and has a convex surface directing to the object side; a sixth lens having a biconvex shape; and a seventh lens having a biconcave shape, arranged in the order from the object side.

According to the imaging lens disclosed in Patent Reference, when restraining a ratio between a focal length of a first lens group composed of the lenses from the first lens to the fourth lens to a focal length of a second lens group composed of the lenses from the fifth lens to the seventh lens in a certain range, it is possible to attain downsizing of the imaging lens and satisfactory correction of aberrations.

The imaging lens described in Patent Reference has a small size, but aberrations on an image plane are not sufficiently corrected and especially distortion is relatively large. Therefore, there is a limit by itself in achieving a high-resolution imaging lens. According to the lens configuration described in Patent Reference, it is difficult to achieve satisfactory aberration correction while downsizing the imaging lens.

Here, such an issue is not a problem specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain downsizing thereof and satisfactory aberration correction.

Further objects and advantages of the present invention will be apparent from the following description of the present invention.

SUMMARY OF THE PRESENT INVENTION

In order to attain the objects described above, according to a first aspect of the present invention, an imaging lens includes a first lens group having positive refractive power, a second lens group having negative refractive power, and a third lens group having negative refractive power, arranged in the order from an object side to an image plane side. The first lens group includes a first lens having positive refractive power, a second lens having negative refractive power, and a third lens having positive refractive power. The second lens group includes a fourth lens and a fifth lens. The third lens group includes a sixth lens having positive refractive power and a seventh lens having negative refractive power.

According to the first aspect of the present invention, when the first lens has an Abbe's number $vd1$, the second lens has an Abbe's number $vd2$, the third lens has an Abbe's number $vd3$, the sixth lens has an Abbe's number $vd6$, and the seventh lens has an Abbe's number $vd7$, the imaging lens of the present invention satisfies the following conditional expressions (1) to (5):

$$40 < vd1 < 75 \tag{1}$$

$$20 < vd2 < 35 \tag{2}$$

$$40 < vd3 < 75 \tag{3}$$

$$40 < vd6 < 75 \quad (4)$$

$$20 < vd7 < 35 \quad (5)$$

According to the first aspect of the present invention, in the imaging lens, there are arranged the first lens group having positive refractive power and the second lens group having negative refractive power, so that a chromatic aberration is satisfactorily corrected in those lens groups. Therefore, according to the imaging lens of the present invention, it is possible to satisfactorily correct aberrations, especially the chromatic aberration, and obtain satisfactory image-forming performance, which is necessary for a high-resolution imaging lens. In addition, according to the imaging lens of the present invention, since the third lens group has negative refractive power, it is possible to suitably downsize the imaging lens.

The first lens group includes three lenses, refractive powers of which are arranged in the order of positive, negative, and positive. Those three lenses are made from lens materials that satisfy the conditional expressions (1) to (3), respectively. With the order of refractive powers of the respective lenses and the arrangement of the Abbe's numbers, in the first lens group, it is possible to suitably restrain generation of the chromatic aberration and satisfactorily correct the chromatic aberration if generated.

Furthermore, according to the first aspect of the present invention, in the imaging lens, the third lens group includes two lenses, which are positive and negative lenses and are made to be a combination of a lens made of a low-dispersion lens material and a lens made of a high-dispersion lens material, so as to satisfy the above-described conditional expressions (4) and (5). For this reason, it is possible to more satisfactorily correct aberrations generated in the first lens group and the second lens group, especially the chromatic aberration. Generally speaking, in order to attain a high-resolution imaging lens, it is necessary to satisfactorily correct aberrations, especially the chromatic aberration.

According to the first aspect of the present invention, in the imaging lens, with the order of refractive powers of the respective lens groups of the first lens group to the third lens group, the order of refractive powers and the arrangement of Abbe's numbers of the three lenses that compose the first lens group, and the order of refractive powers and the arrangement of Abbe's numbers of the two lenses that compose the third lens group, it is possible to more satisfactorily correct the chromatic aberration than conventional imaging lenses.

According to a second aspect of the present invention, when the fourth lens has negative refractive power, the fifth lens has negative refractive power, the fourth lens has an Abbe's number vd4, and the fifth lens has an Abbe's number vd5, the imaging lens having the above-described configuration preferably satisfies the following conditional expressions (6) and (7):

$$20 < vd4 < 35 \quad (6)$$

$$20 < vd5 < 35 \quad (7)$$

According to the second aspect of the present invention, the second lens of the first lens group and the seventh lens of the third lens group respectively have negative refractive power and are respectively formed of high-dispersion materials as indicated in the above conditional expressions (2) and (5). According to the imaging lens of the present invention, the second lens group disposed between the first lens group and the third lens group has negative refractive power. The respective lenses that compose the second lens group are made of high-dispersion materials as indicated in the conditional expressions (6) and (7).

Therefore, according to the second aspect of the present invention, it is possible to more satisfactorily correct the chromatic aberration. Here, the second lens group is composed of two lenses, so that the respective lenses can have smaller refractive powers than when the second lens group is composed of one lens, and thereby it is easy to correct aberrations.

According to a third aspect of the present invention, in the imaging lens having the above-described configuration, the sixth lens and the seventh lens are preferably formed as aspheric shapes such that positive refractive powers thereof are increasing toward the lens peripheries thereof from an optical axis.

According to the third aspect of the present invention, the sixth lens and the seventh lens that compose the third lens group are formed in shapes such that positive refractive powers thereof become strong toward the lens peripheries thereof from the optical axis. With the configuration, it is possible to satisfactorily correct an off-axis chromatic aberration of magnification as well as an axial chromatic aberration, and it is also possible to suitably restrain an incident angle of a light beam emitted from the imaging lens to an imaging element. As is well known, in case of an imaging element of a CCD sensor, a CMOS sensor or the like, a range of incident angle of a light beam that can be taken in a sensor (so-called "chief ray angle (CRA)") is set in advance. Since the sixth lens and the seventh lens have the above-described lens shapes, it is possible to suitably restrain the incident angle of a light beam emitted from the imaging lens to an image plane within the range of CRA. Therefore, it is possible to suitably restrain generation of shading, which is a phenomenon of becoming dark on the image periphery.

According to a fourth aspect of the present invention, when the whole lens system has a focal length f, and a distance on an optical axis between the fifth lens and the sixth lens is D56, the imaging lens having the above-described configuration preferably satisfies the following conditional expression (8):

$$0.02 < D56/f < 0.15 \quad (8)$$

When the imaging lens satisfies the conditional expression (8), it is possible to satisfactorily correct the chromatic aberration and a distortion, while reducing the size of the imaging lens. In addition, when the imaging lens satisfies the conditional expression (8), it is also possible to restrain the incident angle of a light beam emitted from the imaging lens to the imaging element within the range of CRA. When the value exceeds the upper limit of "0.15", it is easy to restrain the incident angle to the imaging element within the range of CRA, and it is advantageous for correction of the chromatic aberration. However, since a back focal length is short, it is difficult to secure space for disposing an insert such as an infrared cut-off filter. Moreover, in the astigmatism, a sagittal image surface curves to the object side, so that it is difficult to obtain satisfactory image-forming performance.

On the other hand, when the value is below the lower limit of "0.02", although it is advantageous for correction of the distortion, an astigmatic difference increases. Furthermore, the chromatic aberration of magnification is excessively corrected (an image-forming point at a short wavelength moves in a direction away from the optical axis relative to an image-forming point at a reference wavelength), so that it is difficult to obtain satisfactory image-forming performance. Moreover, in this case, it is also difficult to restrain the incident angle to the imaging element within the range of CRA.

According to a fifth aspect of the present invention, when the whole lens system has a focal length f and a composite focal length from the first lens to the third lens is f123, the imaging lens having the above-described configuration preferably satisfies the following conditional expression (9):

$$0.6 < f123/f < 1.2 \tag{9}$$

When the imaging lens satisfies the conditional expression (9), it is possible to restrain astigmatism and the chromatic aberration within satisfactory ranges in a balanced manner, while reducing the size of the imaging lens. When the value exceeds the upper limit of "1.2", the positive refractive power of the first lens group is weak relative to the refractive power of the whole lens system. Therefore, although it is advantageous for correcting the chromatic aberration and securing the back focal length, it is difficult to attain downsizing of the imaging lens. In addition, in the astigmatism, a tangential image surface curves to the image plane side and the astigmatic difference increases, so that it is difficult to obtain satisfactory image-forming performance.

On the other hand, when the value is below the lower limit of "0.6", the positive refractive power of the first lens group is strong relative to the refractive power of the whole lens system, so that the negative refractive power of the second lens in the first lens group is relatively weak. For this reason, although it is advantageous for downsizing of the imaging lens and correction of the astigmatism, it is difficult to secure the back focal length. Moreover, the axial chromatic aberration is insufficiently corrected (a focal position at a short wavelength moves to the object side relative to a focal position at a reference wavelength), and the chromatic aberration of magnification is insufficiently corrected (an image-forming point at a short wavelength moves in a direction close to the optical axis relative to an image-forming point at a reference wavelength). Therefore, it is difficult to obtain satisfactory image-forming performance.

According to a sixth aspect of the present invention, when the whole lens system has a focal length f and a composite focal length of the sixth lens and the seventh lens is f67, the imaging lens having the above-described configuration preferably satisfies the following conditional expression (10):

$$-15 < f67/f < -1.5 \tag{10}$$

When the imaging lens satisfies the conditional expression (10), it is possible to restrain the astigmatism, the distortion, and the chromatic aberration within satisfactory ranges in a balanced manner. When the value exceeds the upper limit of "−1.5", it is advantageous for correcting the chromatic aberration of magnification. However, the distortion increases in a plus direction and the astigmatic difference increases at image periphery, so that it is difficult to obtain satisfactory image-forming performance.

On the other hand, when the value is below the lower limit of "−15", although it is advantageous for correction of the distortion and correction of the axial chromatic aberration, the astigmatic difference increases and the chromatic aberration of magnification is insufficiently corrected for the off-axis light beams, so that it is difficult to obtain satisfactory image-forming performance.

According to a seventh aspect of the present invention, in order to more satisfactorily correct the astigmatism, the distortion, and the chromatic aberration, the imaging lens having the above-described configuration preferably satisfies the following conditional expression (10A):

$$-12 < f67/f < -1.5 \tag{10A}$$

According to an eighth aspect of the present invention, when the sixth lens has a focal length f6 and a composite focal length of the fourth lens and the fifth lens is f45, the imaging lens having the above-described configuration preferably satisfies the following conditional expression (11):

$$-2 < f45/f6 < -0.1 \tag{11}$$

When the imaging lens satisfies the conditional expression (11), it is possible to satisfactorily correct the chromatic aberration, the distortion, and the astigmatism, while restraining the incident angle of a light beam emitted from the imaging lens to the imaging element within the range of CRA. When the value exceeds the upper limit of "−0.1", the positive refractive power of the sixth lens is weak relative to the refractive power of the second lens group, so that it is easy to secure the back focal length. However, the distortion increases in the plus direction and the chromatic aberration of magnification is excessively corrected for the off-axis light beams, so that it is difficult to obtain satisfactory image-forming performance.

On the other hand, when the value is below the lower limit of "−2", although it is easy to restrain the incident angle to the imaging element within the range of CRA, the distortion increases in the minus direction and the chromatic aberration of magnification is insufficiently corrected for the off-axis light beams. In addition, the astigmatic difference increases. Therefore, it is difficult to obtain satisfactory image-forming performance.

According to a ninth aspect of the present invention, when the whole lens system has a focal length f and the fourth lens has a focal length f4, the imaging lens having the above-described configuration preferably satisfies the following conditional expression (12):

$$-15 < f4/f < -3 \tag{12}$$

When the imaging lens satisfies the conditional expression (12), it is possible to satisfactorily correct a spherical aberration, the chromatic aberration, and a field curvature. When the value exceeds the upper limit of "−3", the negative refractive power of the fourth lens is strong relative to the refractive power of the whole lens system, so that it is advantageous for correction of the axial chromatic aberration, the chromatic aberration of magnification, and the spherical aberration. However, since the periphery of the image-forming surface curves to the object side, it is difficult to satisfactorily correct the field curvature.

On the other hand, when the value is below the lower limit of "−15", the axial chromatic aberration and the chromatic aberration of magnification are both insufficiently corrected, and the periphery of the image-forming surface curves to the image plane side, so that it is difficult to satisfactorily correct the field curvature. Therefore, in either case, it is difficult to obtain satisfactory image-forming performance.

In order to more satisfactorily correct the spherical aberration, the chromatic aberration, and the field curvature, according to a tenth aspect of the present invention, the imaging lens having the above-described configuration preferably satisfies the following conditional expression (12A):

$$-12 < f4/f < -3 \tag{12A}$$

According to an eleventh aspect of the present invention, when the whole lens system has a focal length f and the first lens has a focal length f1, the imaging lens having the above-described configuration preferably satisfies the following conditional expression (13):

$$0.5 < f1/f < 2.0 \quad (13)$$

When the imaging lens satisfies the conditional expression (13), it is possible to restrain the astigmatism, the chromatic aberration, and the spherical aberration within the preferred ranges in a balanced manner, while downsizing the imaging lens. When the value exceeds the upper limit of "2.0", the first lens has weak refractive power relative to the refractive power of the whole lens system. Therefore, although it is easy to secure the back focal length, it is difficult to attain downsizing of the imaging lens. In addition, in the astigmatism, the sagittal image surface curves to the object side, and the image-forming surface curves to the object side, so that it is difficult to obtain satisfactory image-forming performance.

On the other hand, when the value is below the lower limit of "0.5", although it is advantageous for downsizing of the imaging lens, it is difficult to secure the back focal length. Moreover, in the astigmatism, the tangential image surface curves to the image plane side, and the astigmatic difference increases. In addition, the spherical aberration increases. Therefore, it is difficult to obtain satisfactory image-forming performance.

According to a twelfth aspect of the present invention, when the first lens has a focal length f1, the second lens has a focal length f2, the imaging lens having the above-described configuration preferably satisfies the following conditional expression (14):

$$-4 < f2/f < -0.5 \quad (14)$$

When the imaging lens satisfies the conditional expression (14), it is possible to restrain the spherical aberration, the astigmatism, the field curvature, and the chromatic aberration within preferred ranges in a balanced manner. When the value exceeds the upper limit of "−0.5", the negative refractive power of the second lens is strong relative to the refractive power of the whole lens system. Therefore, although it is advantageous for correction of the axial chromatic aberration and the spherical aberration, the astigmatic difference increases. Accordingly, it is difficult to obtain satisfactory image-forming performance.

On the other hand, when the value is below the lower limit of "−4, the refractive power of the second lens is weak relative to the refractive power of the whole lens system, so that the axial chromatic aberration and the chromatic aberration of magnification are both insufficiently corrected. In addition, the image-forming surface curves to the object side. Therefore, it is difficult to obtain satisfactory image-forming performance.

According to a thirteenth aspect of the present invention, when the first lens has a focal length f1 and the third lens has a focal length f3, the imaging lens having the above-described configuration preferably satisfies the following conditional expression (15):

$$1 < f3/f < 4 \quad (15)$$

When the imaging lens satisfies the conditional expression (15), it is possible to satisfactorily correct the chromatic aberration and the spherical aberration. When the value exceeds the upper limit of "4", the refractive power of the third lens is weak relative to the refractive power of the whole lens system. Therefore, the axial chromatic aberration is insufficiently corrected, and it is difficult to correct the spherical aberration. For this reason, it is difficult to obtain satisfactory image-forming performance.

On the other hand, when the value is below the lower limit of "1", it is advantageous for correction of the spherical aberration and correction of the chromatic aberration. However, the chromatic aberration of the sagittal light beam at image periphery increases. Therefore, it is difficult to obtain satisfactory image-forming performance.

According to the imaging lens of the present invention, it is possible to provide a small-sized imaging lens, which is especially suitable for mounting in a small-sized camera, while having satisfactorily corrected aberrations and high resolution.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since a basic lens configuration is the same among those Numerical Data Examples, the lens configuration of the embodiment will be described with reference to the illustrative sectional view of Numerical Data Example 1.

Figure 1:
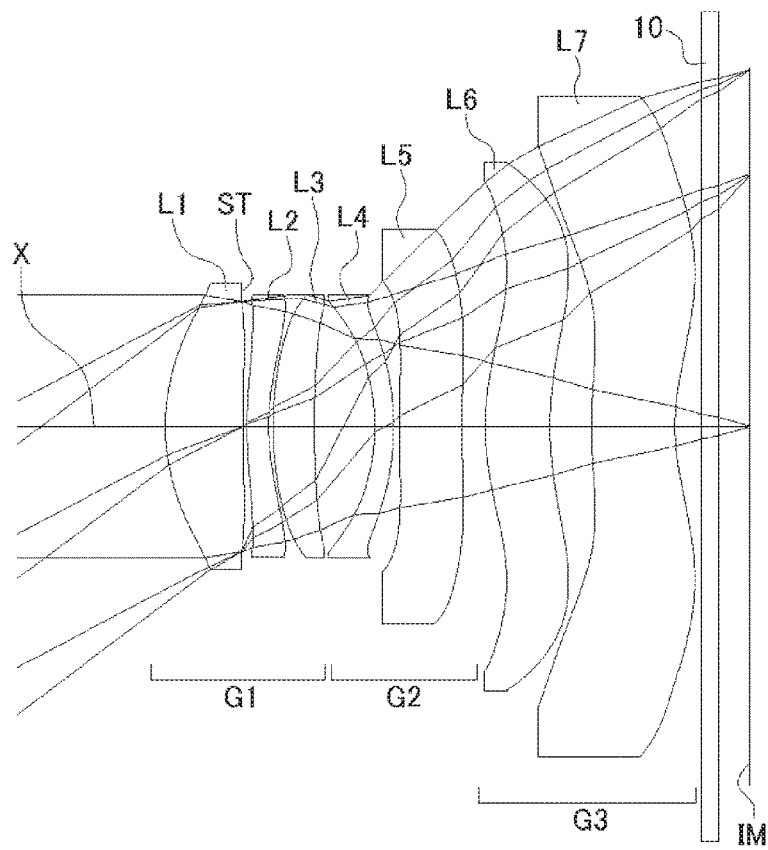
FIG. 1 shows a sectional view of a schematic configuration of an imaging lens in Numerical Data Example 1 according to an embodiment of the present invention.

As shown in FIG. 1, the imaging lens of the embodiment includes a first lens group G1 having positive refractive power, a second lens group G2 having negative refractive power, and a third lens group G3 having negative refractive power, arranged in the order from an object side to an image plane side. Between the third lens group G3 and an image plane IM of an imaging element, there is provided a filter 10. The filter 10 is omissible.

The first lens group G1 includes a first lens L1 having positive refractive power, an aperture stop ST, a second lens L2 having negative refractive power, and a third lens L3 having positive refractive power, arranged in the order from the object side. The first lens L1 is formed in a shape such that a curvature radius r1 of an object-side surface thereof and a curvature radius r2 of an image plane-side surface thereof are both positive, so as to have a shape of a meniscus lens directing a convex surface to the object side near an optical axis X. The shape of the first lens L1 is not limited to the one in Numerical Data Example 1. The first lens L1 can be formed in any shape as long as the curvature radius r1 of the object-side surface thereof is positive. The first lens L1 can be formed in a shape such that the curvature radius r2 of the image plane-side surface thereof is negative, i.e., a shape of a biconvex lens near the optical axis X. Numerical Data Example 3 is an example, in which the first lens L1 has a shape of a biconvex lens near the optical axis X. Here, according to the imaging lens of the embodiment, there is provided an aperture stop ST on the image plane-side surface of the first lens L1.

The second lens L2 is formed in a shape such that a curvature radius r3 of an object-side surface thereof and a curvature radius r4 of an image plane-side surface thereof are both positive, so as to have a shape of a meniscus lens directing a convex surface to the object side near the optical axis X. Here, the shape of the second lens L2 is not limited to the one in Numerical Data Example 1. The second lens L2 can be formed in any shape as long as the curvature radius r4 of the image plane-side surface thereof is positive. The second lens L2 can also be formed in a shape such that the curvature radius r3 of the object-side surface thereof is negative, i.e., a shape of a biconcave lens near the optical axis X.

The third lens L3 is formed in a shape such that a curvature radius r5 of an object-side surface thereof and a curvature radius r6 of an image plane-side surface thereof are both positive, so as to have a shape of a meniscus lens directing a convex surface to the object side near the optical axis X. The shape of the third lens L3 is not limited to the one in Numerical Data Example 1. The third lens L3 can be formed in any shape as long as the curvature radius r5 of the object-side surface thereof is positive. For example, the third lens L3 can also be formed in a shape such that the curvature radius r6 of the image plane-side surface thereof is negative, i.e., a shape of a biconvex lens near the optical axis X.

The second lens group G2 includes a fourth lens L4 having negative refractive power and a fifth lens L5 having negative refractive power, arranged in the order from the object side. Among them, the fourth lens L4 is formed in a shape such that a curvature radius r7 of an object-side surface thereof and a curvature radius r8 of an image plane-side surface thereof are both negative, so as to have a shape of a meniscus lens directing a concave surface to the object side near the optical axis X.

The fifth lens L5 is formed in a shape such that a curvature radius r9 of an object-side surface thereof and a curvature radius r10 of an image plane-side surface thereof are both positive, so as to have a shape of a meniscus lens directing a convex surface to the object side near the optical axis X. Here, the shape of the fifth lens L5 is not limited to the one in Numerical Data Example 1. The fifth lens L5 can also be formed in a shape such that the curvature radius r9 of the object-side surface thereof and the curvature radius r10 of the image plane-side surface thereof are both negative, i.e., a shape of a meniscus lens directing a concave surface to the object side near the optical axis X. Alternatively, the fifth lens L5 can also be formed in a shape such that the curvature radius r9 of the object-side surface thereof is negative and the curvature radius r10 of the image plane-side surface thereof is positive, i.e., a shape of a biconcave lens near the optical axis X. Numerical Data Example 3 is an example, in which the fifth lens L5 is formed in a shape of a meniscus lens directing a concave surface to the object side near the optical axis X.

The third lens group G3 includes a sixth lens L6 having positive refractive power and the seventh lens L7 having negative refractive power, arranged in the order from the object side. The sixth lens L6 is formed in a shape such that a curvature radius r11 of an object-side surface thereof and a curvature radius r12 of an image plane-side surface thereof are both positive, so as to have a shape of a meniscus lens directing a convex surface to the object side near the optical axis X. In addition, the seventh lens L7 is formed in a shape such that a curvature radius r13 of an object-side surface thereof and a curvature radius r14 of an image plane-side surface thereof are both positive, so as to have a shape of a meniscus lens directing a convex surface thereof to the object side near the optical axis X.

In the sixth lens L6 and the seventh lens L7, the object-side surfaces thereof and the image plane-side surfaces thereof are formed as aspheric shapes having inflexion points, and are formed in shapes so as to have strong positive refractive powers toward the lens peripheries from the optical axis X. With those shapes of the sixth lens L6 and the seventh lens L7, it is possible to satisfactorily correct an off-axis chromatic aberration of magnification as well as an axial chromatic aberration. In addition, it is also possible to suitably restrain the incident angle of a light beam emitted from the imaging lens to the image plane IM within the range of a chief ray angle (CRA).

Here, according to the embodiment, both the object-side surfaces and the image plane-side surfaces of the sixth lens L6 and the seventh lens L7 are formed as aspheric shapes having inflexion points. However, it is not necessary to form the both surfaces as aspheric shapes having inflexion points. Even when one of those surfaces is formed as an aspheric shape having an inflexion point, it is still possible to form one or both of the sixth lens L6 and the seventh lens L7 in a shape so as to have strong positive refractive power toward the lens periphery from the optical axis X. Moreover, depending on required optical performance and/or the degree of downsizing of the imaging lens, it may not be necessary to provide an inflexion point on the sixth lens L6 and the seventh lens L7. The imaging lens of the embodiment satisfies the following conditional expressions (1) to (15):

$$40 < vd1 < 75 \qquad (1)$$

$$20 < vd2 < 35 \qquad (2)$$

$$40 < vd3 < 75 \qquad (3)$$

$40 < vd6 < 75$ (4)

$20 < vd7 < 35$ (5)

$20 < vd4 < 35$ (6)

$20 < vd5 < 35$ (7)

$0.02 < D56/f < 0.15$ (8)

$0.6 < f123/f < 1.2$ (9)

$-15 < f67/f < -1.5$ (10)

$-2 < f45/f6 < -0.1$ (11)

$-15 < f4/f < -3$ (12)

$0.5 < f1/f < 2.0$ (13)

$-4 < f2/f < -0.5$ (14)

$1 < f3/f < 4$ (15)

In the above conditional expressions:
vd1: Abbe's number of a first lens L1
vd2: Abbe's number of a second lens L2
vd3: Abbe's number of a third lens L3
vd4: Abbe's number of a fourth lens L4
vd5: Abbe's number of a fifth lens L5
vd6: Abbe's number of a sixth lens L6
vd7: Abbe's number of a seventh lens L7
f: Focal length of a whole lens system
f1: Focal length of the first lens L1
f2: Focal length of the second lens L2
f3: Focal length of the third lens L3
f4: Focal length of the fourth lens L4
f6: Focal length of the sixth lens L6
f45: Composite focal length of the fourth lens L4 and the fifth lens L5
f67: Composite focal length of the sixth lens L6 and the seventh lens L7
f123: Composite focal length of the lenses from the first lens L1 to the third lens L3
D56: Distance on an optical axis X between the fifth lens L5 and the sixth lens L6

In order to more satisfactorily correct aberrations, the imaging lens of the embodiment satisfies the following conditional expressions (10A) and (12A):

$-12 < f67/f < -1.5$ (10A)

$-12 < f4/f < -3$ (12A)

Here, it is not necessary to satisfy all of the above conditional expressions, and it is achievable to obtain an effect corresponding to the respective conditional expressions when any single one of the above conditional expressions is individually satisfied.

In the embodiment, all lens surfaces of the respective lenses are formed as an aspheric surface. When the aspheric shapes applied to the lens surfaces have an axis Z in a direction of the optical axis X, a height H in a direction perpendicular to the optical axis X, a conic constant k, and aspheric coefficients $A_4$, $A_6$, $A_8$, $A_{10}$, $A_{12}$, $A_{14}$, and $A_{16}$, the shapes of the aspheric surfaces of the lens surfaces are expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ [Formula 1]

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index, and vd represents an Abbe's number, respectively. Here, aspheric surfaces are indicated with surface numbers i affixed with * (asterisk).

Numerical Data Example 1

Basic lens data are shown below.

f = 8.04 mm, Fno = 1.8, ω = 36.7°
Unit: mm

Surface Data

| Surface Number i | r | d | nd | vd |
|---|---|---|---|---|
| (Object) | ∞ | ∞ | | |
| 1* | 3.533 | 1.315 | 1.5346 | 56.1 (=vd1) |
| 2* (Stop) | 32.140 | 0.067 | | |
| 3* | 9.059 | 0.365 | 1.6355 | 24.0 (=vd2) |
| 4* | 4.420 | 0.076 | | |
| 5* | 5.948 | 0.701 | 1.5346 | 56.1 (=vd3) |
| 6* | 18.226 | 1.016 | | |
| 7* | -3.745 | 0.330 | 1.6355 | 24.0 (=vd4) |
| 8* | -4.940 | 0.101 | | |
| 9* | 30.217 | 1.053 | 1.6355 | 24.0 (=vd5) |
| 10* | 20.289 | 0.394 (=D56) | | |
| 11* | 4.406 | 1.095 | 1.5346 | 56.1 (=vd6) |
| 12* | 5.672 | 0.698 | | |
| 13* | 7.325 | 1.425 | 1.6355 | 24.0 (=vd7) |
| 14* | 3.753 | 0.440 | | |
| 15 | ∞ | 0.300 | 1.5168 | 64.2 |
| 16 | ∞ | 0.530 | | |
| (Image plane) | ∞ | | | |

Aspheric Surface Data

First Surface k = 0.000, $A_4$ = -1.830E-03, $A_6$ = 1.363E-04, $A_8$ = -1.227E-04, $A_{10}$ = 2.595E-07, $A_{12}$ = -2.790E-07, $A_{14}$ = -8.280E-08, $A_{16}$ = 8.141E-09
Second Surface k = 0.000, $A_4$ = 1.280E-02, $A_6$ = -1.457E-02, $A_8$ = 5.183E-03, $A_{10}$ = -9.113E-04, $A_{12}$ = 5.259E-05, $A_{14}$ = 5.804E-06, $A_{16}$ = -7.418E-07
Third Surface k = 0.000, $A_4$ = 1.459E-02, $A_6$ = -2.057E-02, $A_8$ = 7.412E-03, $A_{10}$ = -1.296E-03, $A_{12}$ = 9.735E-05, $A_{14}$ = 1.620E-06, $A_{16}$ = -5.796E-07
Fourth Surface k = 0.000, $A_4$ = 5.572E-03, $A_6$ = -1.275E-02, $A_8$ = 3.429E-03, $A_{10}$ = -3.506E-04, $A_{12}$ = 1.621E-06, $A_{14}$ = -4.572E-07, $A_{16}$ = 1.498E-07
Fifth Surface k = 0.000, $A_4$ = 5.066E-03, $A_6$ = -3.926E-03, $A_8$ = 1.347E-03, $A_{10}$ = -1.231E-04, $A_{12}$ = -2.627E-07, $A_{14}$ = 9.933E-07, $A_{16}$ = -4.663E-08

-continued f = 8.04 mm, Fno = 1.8, ω = 36.7°
Unit: mm

Sixth Surface k = 0.000, $A_4$ = −3.072E−03, $A_6$ = 7.384E−04, $A_8$ = 9.673E−04, $A_{10}$ = −3.384E−04, $A_{12}$ = 2.739E−05, $A_{14}$ = 5.139E−06, $A_{16}$ = −9.157E−07
Seventh Surface k = 0.000, $A_4$ = −1.163E−02, $A_6$ = 1.853E−03, $A_8$ = −8.807E−07, $A_{10}$ = −2.749E−05, $A_{12}$ = −1.385E−05, $A_{14}$ = 1.477E−06, $A_{16}$ = 3.064E−07
Eighth Surface k = 0.000, $A_4$ = −1.143E−02, $A_6$ = 2.318E−03, $A_8$ = 5.775E−06, $A_{10}$ = 7.657E−06, $A_{12}$ = −8.628E−07, $A_{14}$ = −1.810E−06, $A_{16}$ = 6.733E−07
Ninth Surface k = 0.000, $A_4$ = −5.674E−03, $A_6$ = −6.296E−04, $A_8$ = 4.171E−05, $A_{10}$ = −8.677E−06, $A_{12}$ = −3.752E−07, $A_{14}$ = 8.901E−08, $A_{16}$ = −2.474E−08
Tenth Surface k = 0.000, $A_4$ = −6.851E−03, $A_6$ = −1.387E−04, $A_8$ = 5.738E−05, $A_{10}$ = −3.989E−06, $A_{12}$ = 2.015E−07, $A_{14}$ = −1.889E−09, $A_{16}$ = −1.030E−09
Eleventh Surface k = 0.000, $A_4$ = −1.075E−02, $A_6$ = −1.820E−05, $A_8$ = 2.366E−06, $A_{10}$ = 5.268E−07, $A_{12}$ = −4.773E−09, $A_{14}$ = 4.042E−10, $A_{16}$ = −9.365E−11
Twelfth Surface k = 0.000, $A_4$ = −5.711E−03, $A_6$ = −3.528E−04, $A_8$ = 3.504E−05, $A_{10}$ = −1.708E−06, $A_{12}$ = 3.413E−08, $A_{14}$ = 1.354E−10, $A_{16}$ = −1.309E−11
Thirteenth Surface k = 0.000, $A_4$ = −2.086E−02, $A_6$ = 1.367E−03, $A_8$ = −3.316E−05, $A_{10}$ = −2.029E−08, $A_{12}$ = 5.364E−09, $A_{14}$ = 2.437E−11, $A_{16}$ = 2.910E−12
Fourteenth Surface k = −6.723, $A_4$ = −8.556E−03, $A_6$ = 4.592E−04, $A_8$ = −1.667E−05, $A_{10}$ = 2.942E−07, $A_{12}$ = 1.150E−08, $A_{14}$ = −6.750E−10, $A_{16}$ = 8.820E−12 f1 = 7.31 mm
f2 = −14.01 mm
f3 = 16.19 mm
f4 = −27.27 mm
f5 = −101.34 mm
f6 = 28.38 mm
f7 = −14.33 mm
f45 = −20.98 mm
f67 = −46.34 mm
f123 = 7.64 mm

The values of the respective conditional expressions are as follows:

D56/f = 0.05
f1/f = 0.91
f2/f = −1.74
f3/f = 2.02
f4/f = −3.39
f67/f = −5.77
f45/f6 = −0.74
f123/f = 0.95

Accordingly, the imaging lens of Numerical Data Example 1 satisfies the above-described conditional expressions. The distance on the optical axis X from the object-side surface of the first lens L1 to the image plane IM (length in air for the filter 10) is 9.80 mm, and downsizing of the imaging lens is attained.

Figure 2:
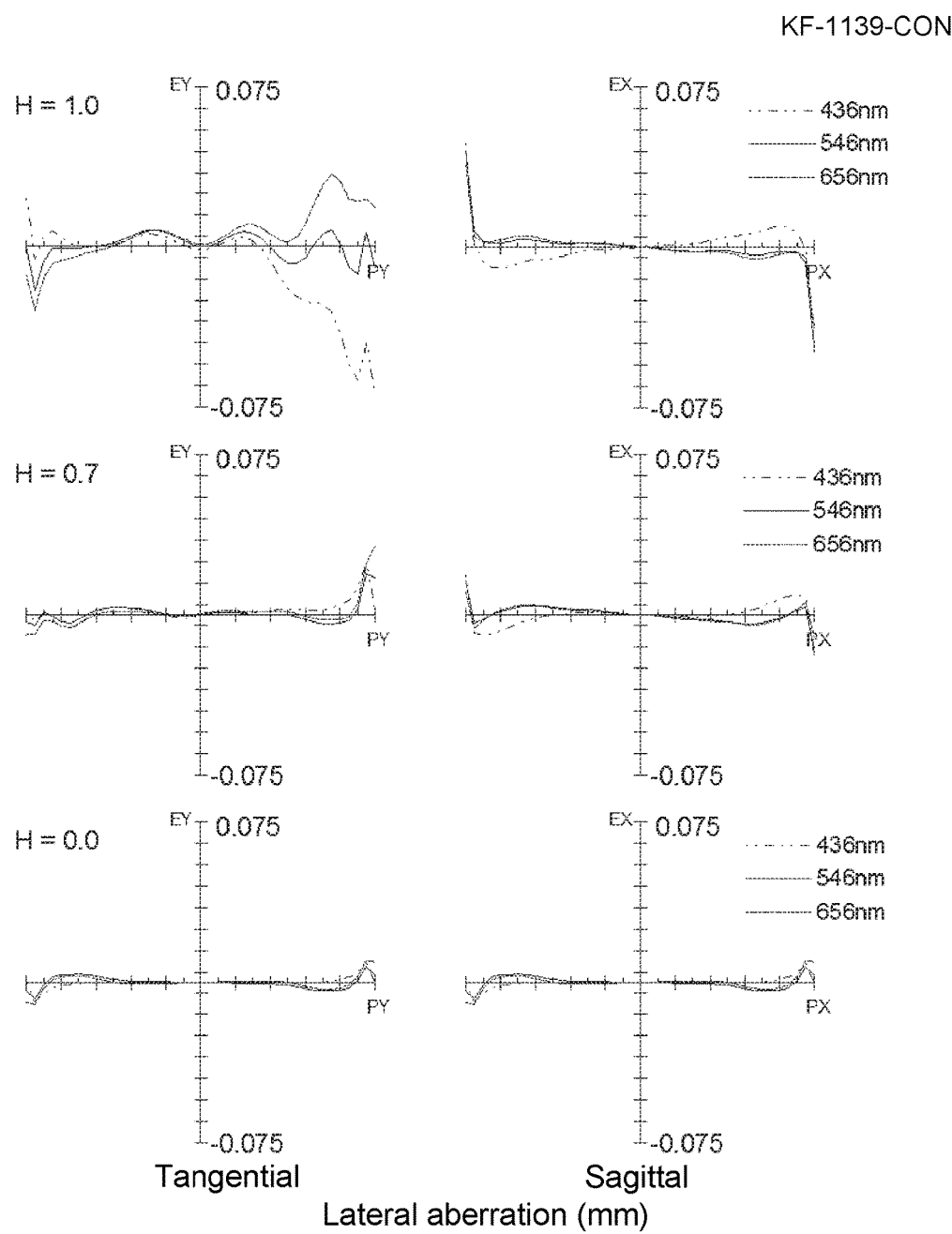
FIG. 2 is an aberration diagram showing a lateral aberration of the imaging lens of FIG. 1.
Figure 3:
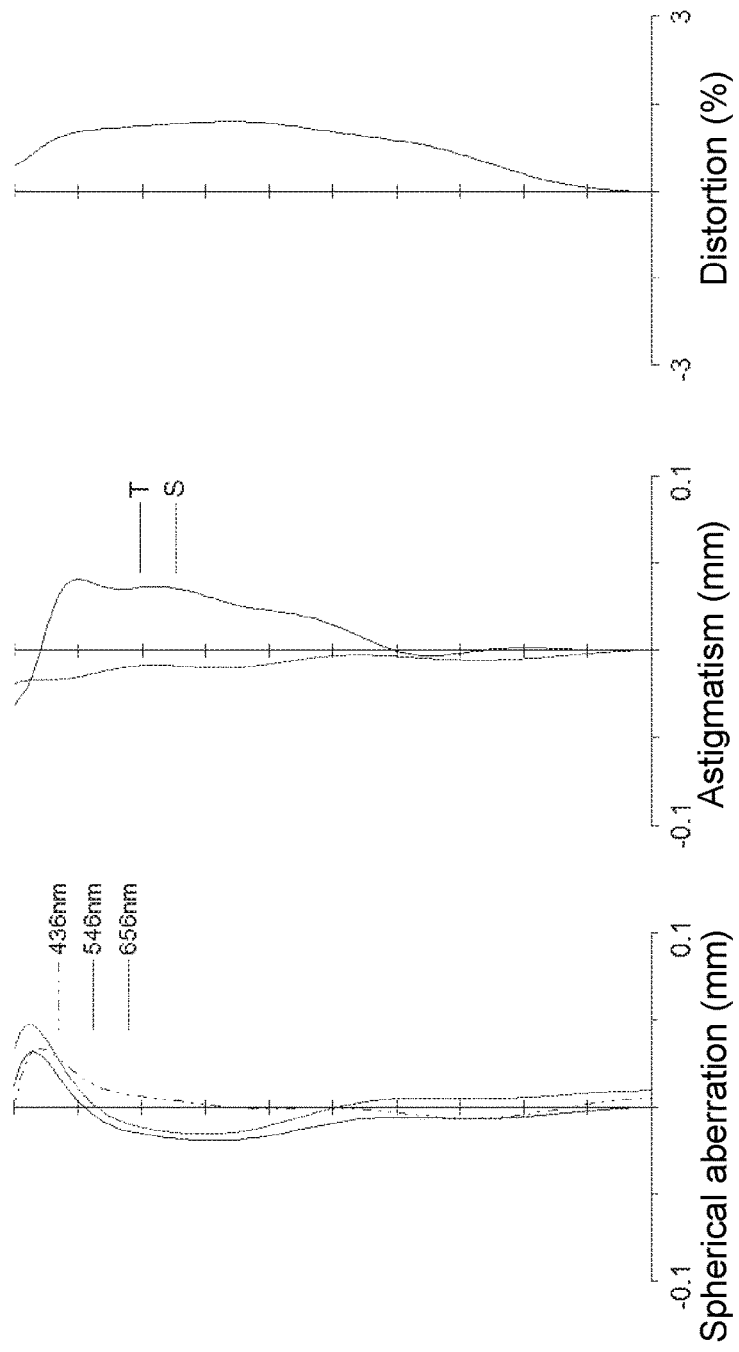
FIG. 3 is an aberration diagram showing a spherical aberration, astigmatism, and a distortion of the imaging lens of FIG. 1.
Figure 4:
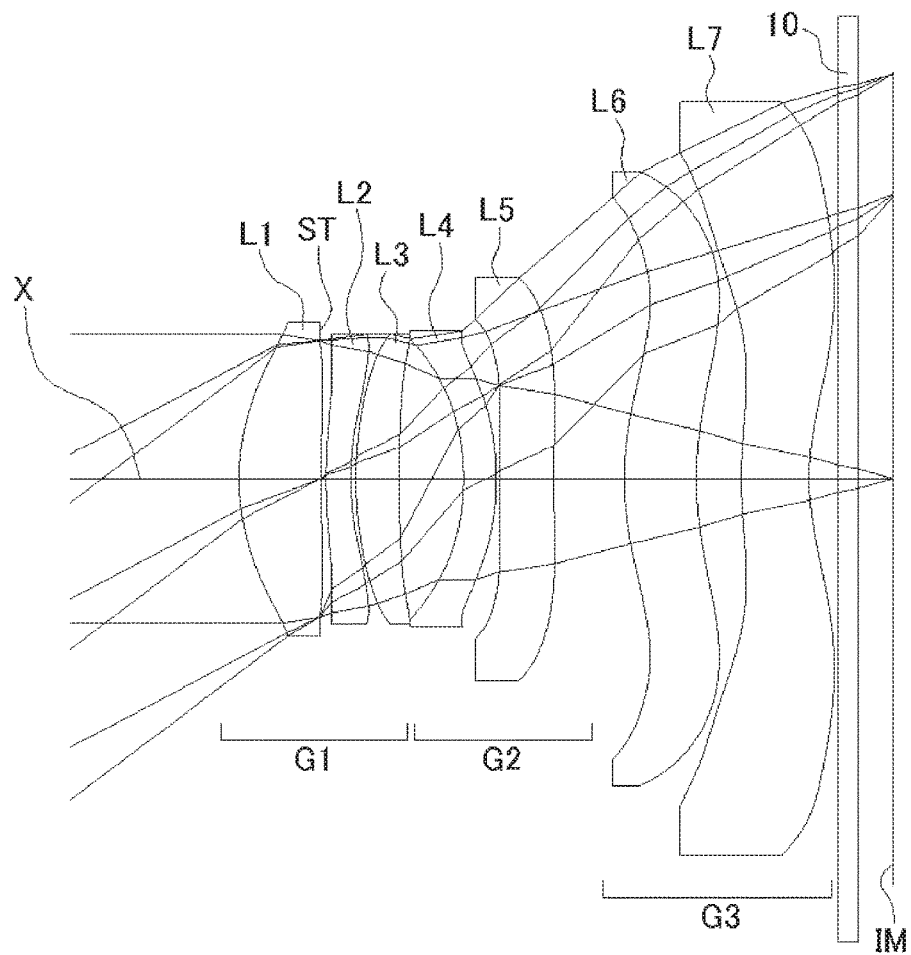
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height (hereinafter referred to as "image height ratio H") in the imaging lens of Numerical Data Example 1, which is divided into a tangential direction and a sagittal direction (The same is true for FIGS. 5, 8, 11, 14, and 17). Furthermore, FIG. 3 shows a spherical aberration (mm), astigmatism (mm), and a distortion (%), respectively, of the imaging lens of Numerical Data Example 1. In the aberration diagrams, for the lateral aberration diagrams and spherical aberration diagrams, aberrations at respective wavelengths, i.e. a g line (435.84 nm), an e line (546.07 nm), and a C line (656.27 nm) are indicated. In the astigmatism diagram, an aberration on a sagittal image surface S and an aberration on a tangential image surface T are respectively indicated (The same is true for FIGS. 6, 9, 12, 15, and 18). As shown in FIGS. 2 and 3, according to the imaging lens of Numerical Data Example 1, the aberrations are satisfactorily corrected.

Numerical Data Example 2

Basic lens data are shown below.

f = 7.94 mm, Fno = 1.8, ω = 37.1°
Unit: mm

Surface Data

| Surface Number i | r | d | nd | vd |
|---|---|---|---|---|
| (Object) | ∞ | ∞ | | |
| 1* | 3.557 | 1.235 | 1.5346 | 56.1 (=vd1) |
| 2* (Stop) | 32.077 | 0.080 | | |
| 3* | 9.575 | 0.371 | 1.6355 | 24.0 (=vd2) |
| 4* | 4.489 | 0.077 | | |
| 5* | 6.066 | 0.648 | 1.5346 | 56.1 (=vd3) |
| 6* | 17.517 | 0.976 | | |
| 7* | −3.765 | 0.507 | 1.6355 | 24.0 (=vd4) |
| 8* | −4.237 | 0.047 | | |
| 9* | 33.893 | 0.818 | 1.6355 | 24.0 (=vd5) |
| 10* | 22.281 | 1.062 (=D56) | | |
| 11* | 4.498 | 1.090 | 1.5346 | 56.1 (=vd6) |
| 12* | 5.358 | 0.679 | | |
| 13* | 6.805 | 1.030 | 1.6355 | 24.0 (=vd7) |
| 14* | 3.680 | 0.440 | | |
| 15 | ∞ | 0.300 | 1.5168 | 64.2 |
| 16 | ∞ | 0.530 | | |
| (Image plane) | ∞ | | | |

Aspheric Surface Data

First Surface k = 0.000, $A_4$ = −1.726E−03, $A_6$ = 1.683E−04, $A_8$ = −1.209E−04, $A_{10}$ = −4.321E−08, $A_{12}$ = −4.405E−07, $A_{14}$ = −1.069E−07, $A_{16}$ = 8.333E−09
Second Surface k = 0.000, $A_4$ = 1.292E−02, $A_6$ = −1.457E−02, $A_8$ = 5.182E−03, $A_{10}$ = −9.118E−04, $A_{12}$ = 5.248E−05, $A_{14}$ = 5.791E−06, $A_{16}$ = −7.380E−07
Third Surface k = 0.000, $A_4$ = 1.456E−02, $A_6$ = −2.055E−02, $A_8$ = 7.420E−03, $A_{10}$ = −1.295E−03, $A_{12}$ = 9.758E−05, $A_{14}$ = 1.604E−06, $A_{16}$ = −6.025E−07
Fourth Surface k = 0.000, $A_4$ = 5.582E−03, $A_6$ = −1.276E−02, $A_8$ = 3.429E−03, $A_{10}$ = −3.507E−04, $A_{12}$ = 1.532E−06, $A_{14}$ = −4.954E−07, $A_{16}$ = 1.375E−07
Fifth Surface k = 0.000, $A_4$ = 4.583E−03, $A_6$ = −3.932E−03, $A_8$ = 1.338E−03, $A_{10}$ = −1.251E−04, $A_{12}$ = −5.200E−07, $A_{14}$ = 9.596E−07, $A_{16}$ = −4.592E−08
Sixth Surface k = 0.000, $A_4$ = −3.136E−03, $A_6$ = 7.503E−04, $A_8$ = 9.754E−04, $A_{10}$ = −3.388E−04, $A_{12}$ = 2.684E−05, $A_{14}$ = 4.994E−06, $A_{16}$ = −9.459E−07
Seventh Surface k = 0.000, $A_4$ = −1.232E−02, $A_6$ = 1.820E−03, $A_8$ = 3.482E−06, $A_{10}$ = −2.652E−05, $A_{12}$ = −1.373E−05, $A_{14}$ = 1.425E−06, $A_{16}$ = 2.744E−07
Eighth Surface k = 0.000, $A_4$ = −1.064E−02, $A_6$ = 2.321E−03, $A_8$ = −3.718E−06, $A_{10}$ = 5.205E−06, $A_{12}$ = −1.569E−06, $A_{14}$ = −1.971E−06, $A_{16}$ = 6.443E−07

-continued f = 7.94 mm, Fno = 1.8, ω = 37.1°
Unit: mm

Ninth Surface k = 0.000, $A_4$ = −8.793E−03, $A_6$ = −6.347E−04, $A_8$ = 8.162E−05, $A_{10}$ = −7.303E−06, $A_{12}$ = −6.511E−07, $A_{14}$ = 1.035E−08, $A_{16}$ = −4.041E−08
Tenth Surface k = 0.000, $A_4$ = −9.201E−03, $A_6$ = −2.143E−05, $A_8$ = 5.445E−05, $A_{10}$ = −4.648E−06, $A_{12}$ = 1.527E−07, $A_{14}$ = −5.252E−09, $A_{16}$ = −1.420E−09
Eleventh Surface k = 0.000, $A_4$ = −9.386E−03, $A_6$ = −3.833E−05, $A_8$ = −1.706E−06, $A_{10}$ = 4.515E−07, $A_{12}$ = −2.894E−09, $A_{14}$ = 6.350E−10, $A_{16}$ = −7.863E−11
Twelfth Surface k = 0.000, $A_4$ = −5.857E−03, $A_6$ = −3.841E−04, $A_8$ = 3.712E−05, $A_{10}$ = −1.617E−06,
$A_{12}$ = 3.448E−08, $A_{14}$ = 1.940E−11, $A_{16}$ = −2.053E−11
Thirteenth Surface k = 0.000, $A_4$ = −2.058E−02, $A_6$ = 1.357E−03, $A_8$ = −3.344E−05, $A_{10}$ = −2.400E−08, $A_{12}$ = 5.287E−09, $A_{14}$ = 2.116E−11, $A_{16}$ = 2.673E−12
Fourteenth Surface k = −7.024, $A_4$ = −7.543E−03, $A_6$ = 4.526E−04, $A_8$ = −1.720E−05, $A_{10}$ = 2.880E−07, $A_{12}$ = 1.156E−08, $A_{14}$ = −6.712E−10, $A_{16}$ = 8.883E−12 f1 = 7.37 mm
f2 = −13.69 mm
f3 = 17.02 mm
f4 = −91.33 mm
f5 = −105.21 mm
f6 = 36.38 mm
f7 = −14.46 mm
f45 = −47.36 mm
f67 = −31.69 mm
f123 = 7.96 mm

The values of the respective conditional expressions are as follows:

D56/f = 0.13
f1/f = 0.93
f2/f = −1.72
f3/f = 2.14
f4/f = −11.50
f67/f = −3.99
f45/f6 = −1.30
f123/f = 1.00

Accordingly, the imaging lens of Numerical Data Example 2 satisfies the above-described conditional expressions. The distance on the optical axis X from the object-side surface of the first lens L1 to the image plane IM (length in air for the filter 10) is 9.79 mm, and downsizing of the imaging lens is attained.

Figure 5:
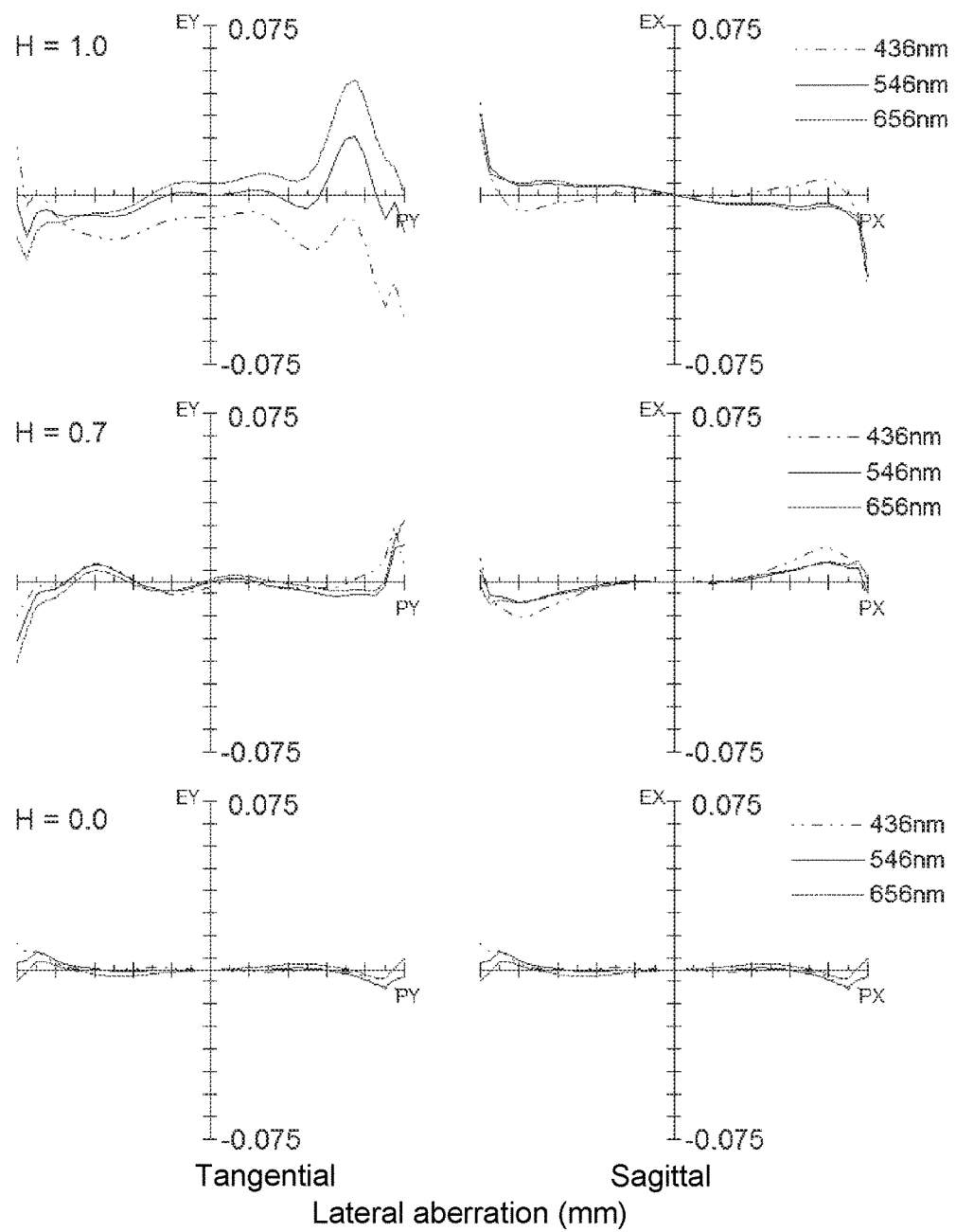
FIG. 5 is an aberration diagram showing a lateral aberration of the imaging lens of FIG. 4.
Figure 6:
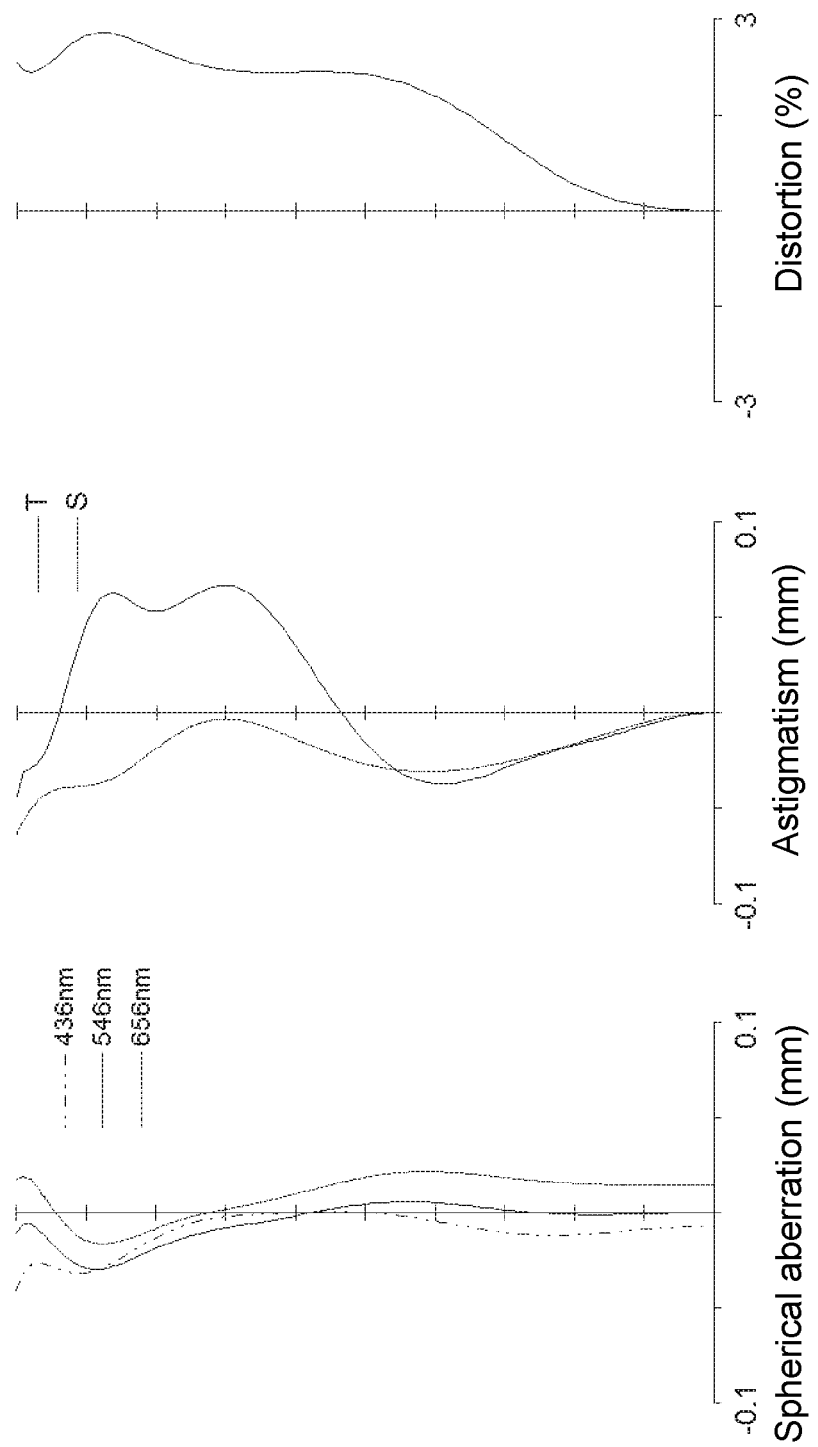
FIG. 6 is an aberration diagram showing a spherical aberration, astigmatism, and a distortion of the imaging lens of FIG. 4.
Figure 7:
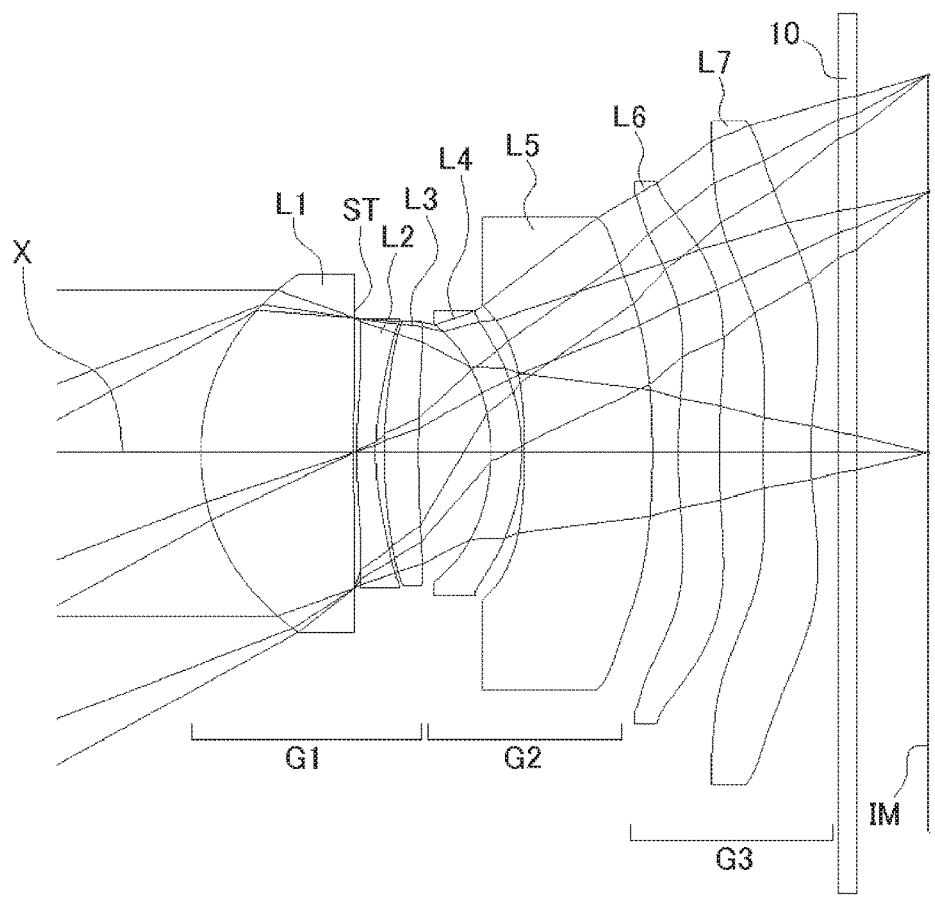
FIG. 7 shows a sectional view of a schematic configuration of an imaging lens in Numerical Data Example 3 according to the embodiment of the present invention.

FIG. 5 shows a lateral aberration that corresponds to the image height ratio H, and FIG. 6 shows a spherical aberration (mm), astigmatism (mm), and a distortion (%), respectively, of the imaging lens of Numerical Data Example 2. As shown in FIGS. 5 and 6, according to the imaging lens of Numerical Data Example 2, the aberrations are also satisfactorily corrected.

Numerical Data Example 3

Basic lens data are shown below.

f = 10.88 mm, Fno = 2.1, ω = 28.9°
Unit: mm

Surface Data

| Surface Number i | r | d | nd | vd |
|---|---|---|---|---|
| (Object) | ∞ | ∞ | | |
| 1* | 3.300 | 2.430 | 1.5346 | 56.1 (=vd1) |
| 2* (Stop) | −311.769 | 0.049 | | |
| 3* | 15.636 | 0.296 | 1.6355 | 24.0 (=vd2) |
| 4* | 4.847 | 0.134 | | |
| 5* | 8.086 | 0.541 | 1.5346 | 56.1 (=vd3) |
| 6* | 17.887 | 1.152 | | |
| 7* | −3.268 | 0.492 | 1.6355 | 24.0 (=vd4) |
| 8* | −3.911 | 0.050 | | |
| 9* | −10.323 | 2.024 | 1.6355 | 24.0 (=vd5) |
| 10* | −17.420 | 0.409 (=D56) | | |
| 11* | 8.927 | 0.646 | 1.5346 | 56.1 (=vd6) |
| 12* | 10.432 | 0.700 | | |
| 13* | 13.148 | 0.760 | 1.6355 | 24.0 (=vd7) |
| 14* | 5.511 | 0.440 | | |
| 15 | ∞ | 0.300 | 1.5168 | 64.2 |
| 16 | ∞ | 1.131 | | |
| (Image plane) | ∞ | | | |

Aspheric Surface Data

First Surface k = 0.000, $A_4$ = −1.038E−03, $A_6$ = 3.430E−04, $A_8$ = −8.024E−05, $A_{10}$ = 6.292E−06, $A_{12}$ = 2.127E−07, $A_{14}$ = −5.376E−08, $A_{16}$ = −5.718E−10
Second Surface k = 0.000, $A_4$ = 1.842E−02, $A_6$ = −1.448E−02, $A_8$ = 5.161E−03, $A_{10}$ = −9.132E−04, $A_{12}$ = 5.236E−05, $A_{14}$ = 5.824E−06, $A_{16}$ = −7.112E−07
Third Surface k = 0.000, $A_4$ = 1.704E−02, $A_6$ = −2.025E−02, $A_8$ = 7.416E−03, $A_{10}$ = −1.305E−03, $A_{12}$ = 9.570E−05, $A_{14}$ = 1.656E−06, $A_{16}$ = −4.532E−07
Fourth Surface k = 0.000, $A_4$ = 6.821E−03, $A_6$ = −1.205E−02, $A_8$ = 3.471E−03, $A_{10}$ = −3.456E−04, $A_{12}$ = 3.834E−06, $A_{14}$ = 1.155E−07, $A_{16}$ = 2.306E−07
Fifth Surface k = 0.000, $A_4$ = 4.042E−03, $A_6$ = −4.732E−03, $A_8$ = 1.319E−03, $A_{10}$ = −1.148E−04, $A_{12}$ = 1.088E−06, $A_{14}$ = 1.034E−06, $A_{16}$ = −3.437E−08
Sixth Surface k = 0.000, $A_4$ = −4.938E−03, $A_6$ = 1.613E−04, $A_8$ = 9.595E−04, $A_{10}$ = −3.361E−04, $A_{12}$ = 2.670E−05, $A_{14}$ = 4.836E−06, $A_{16}$ = −1.031E−06
Seventh Surface k = 0.000, $A_4$ = −8.177E−03, $A_6$ = 1.125E−03, $A_8$ = −9.875E−05, $A_{10}$ = −4.778E−05, $A_{12}$ = −1.854E−05, $A_{14}$ = 1.300E−06, $A_{16}$ = 4.278E−07
Eighth Surface k = 0.000, $A_4$ = −8.574E−03, $A_6$ = 1.865E−03, $A_8$ = −1.597E−04, $A_{10}$ = −1.638E−05, $A_{12}$ = −3.099E−06, $A_{14}$ = −1.833E−06, $A_{16}$ = 7.218E−07
Ninth Surface k = 0.000, $A_4$ = −7.660E−03, $A_6$ = −5.036E−04, $A_8$ = −4.274E−06, $A_{10}$ = −2.335E−05, $A_{12}$ = −1.854E−06, $A_{14}$ = 2.960E−07, $A_{16}$ = 3.958E−08
Tenth Surface k = 0.000, $A_4$ = −4.613E−03, $A_6$ = −1.808E−04, $A_8$ = 6.170E−05, $A_{10}$ = −3.871E−06, $A_{12}$ = 1.859E−07, $A_{14}$ = −1.096E−09, $A_{16}$ = −4.257E−10
Eleventh Surface k = 0.000, $A_4$ = −1.110E−02, $A_6$ = 4.474E−05, $A_8$ = 9.432E−06, $A_{10}$ = 7.902E−07, $A_{12}$ = 1.870E−09, $A_{14}$ = 3.984E−10, $A_{16}$ = −1.193E−10

-continued f = 10.88 mm, Fno = 2.1, ω = 28.9°
Unit: mm

Twelfth Surface k = 0.000, $A_4$ = −7.493E−03, $A_6$ = −2.431E−04, $A_8$ = 3.817E−05, $A_{10}$ = −1.743E−06, $A_{12}$ = 3.133E−08, $A_{14}$ = 2.160E−10, $A_{16}$ = 5.987E−12
Thirteenth Surface k = 0.000, $A_4$ = −1.939E−02, $A_6$ = 1.379E−03, $A_8$ = −3.268E−05, $A_{10}$ = −5.612E−09, $A_{12}$ = 5.547E−09, $A_{14}$ = 7.726E−12, $A_{16}$ = 1.206E−12
Fourteenth Surface k = −1.661E+01, $A_4$ = −1.191E−02, $A_6$ = 6.454E−04, $A_8$ = −1.707E−05, $A_{10}$ = 2.452E−07, $A_{12}$ = 1.012E−08, $A_{14}$ = −6.891E−10, $A_{16}$ = 1.006E−11 f1 = 6.12 mm
f2 = −11.17 mm
f3 = 27.08 mm
f4 = −44.47 mm
f5 = −44.83 mm
f6 = 100.70 mm
f7 = −15.53 mm
f45 = −22.17 mm
f67 = −19.29 mm
f123 = 7.83 mm

The values of the respective conditional expressions are as follows:

D56/f = 0.04
f1/f = 0.56
f2/f = −1.03
f3/f = 2.49
f4/f = −4.09
f67/f = −1.77
f45/f6 = −0.22
f123/f = 0.72

Accordingly, the imaging lens of Numerical Data Example 3 satisfies the above-described conditional expressions. The distance on the optical axis X from the object-side surface of the first lens L1 to the image plane IM (length in air for the filter 10) is 11.45 mm, and downsizing of the imaging lens is attained.

Figure 8:
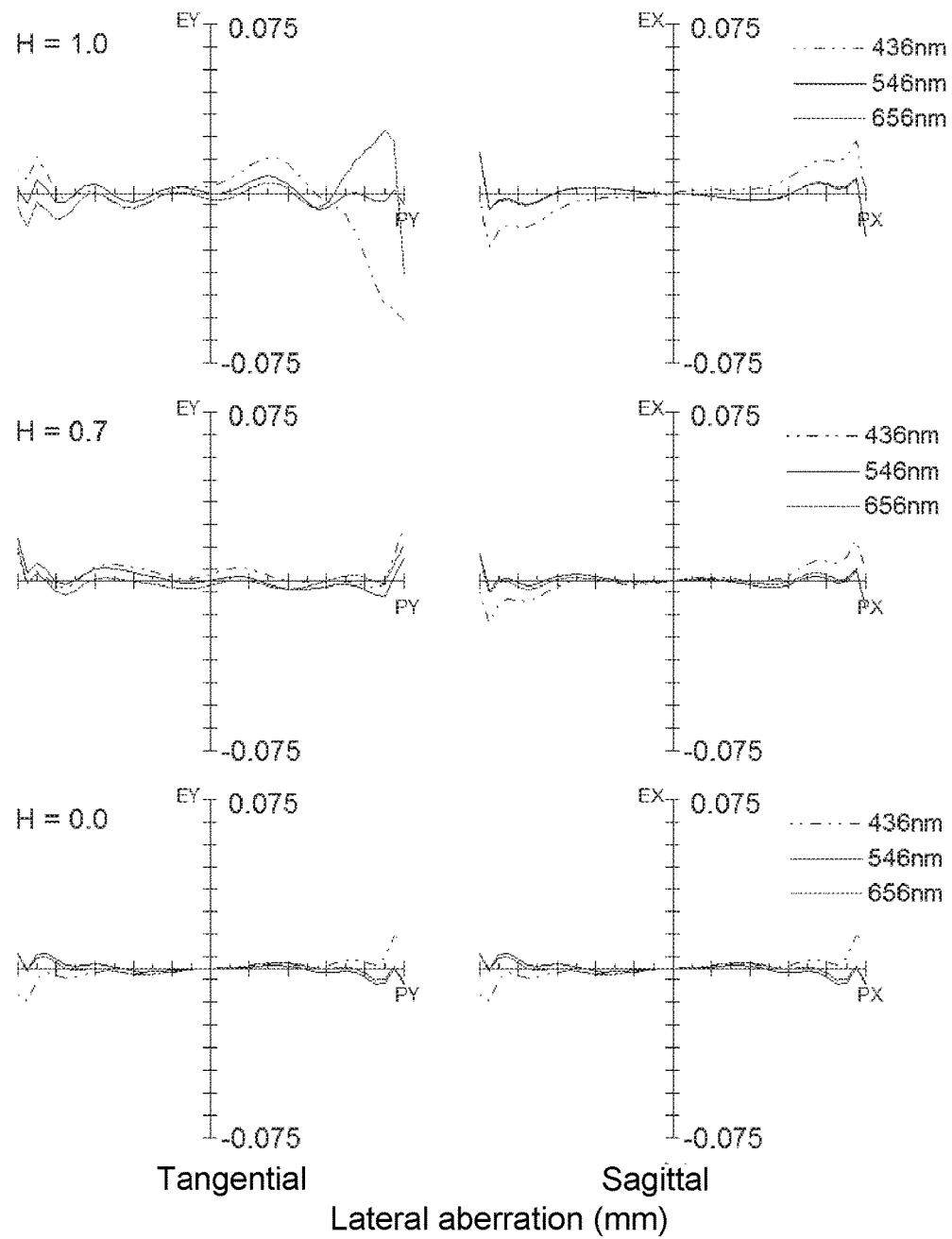
FIG. 8 is an aberration diagram showing a lateral aberration of the imaging lens of FIG. 7.
Figure 9:
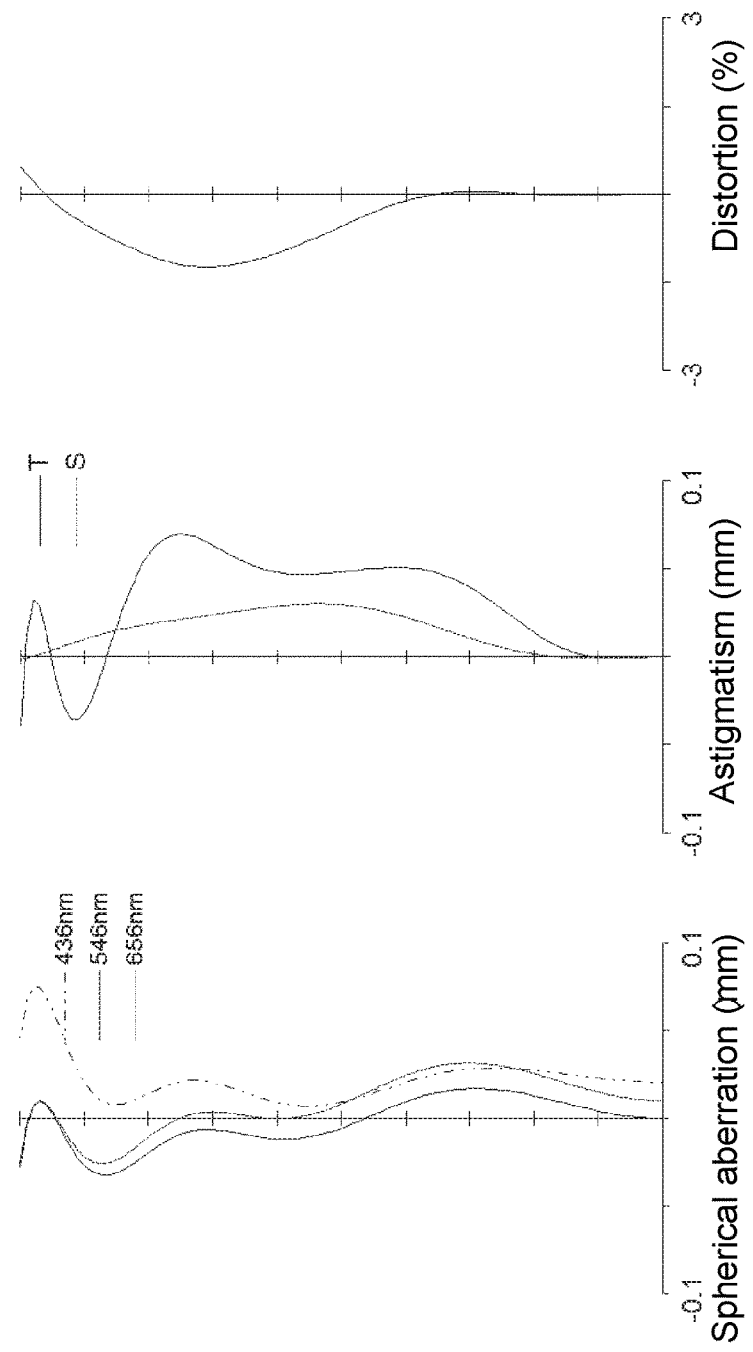
FIG. 9 is an aberration diagram showing a spherical aberration, astigmatism, and a distortion of the imaging lens of FIG. 7.
Figure 10:
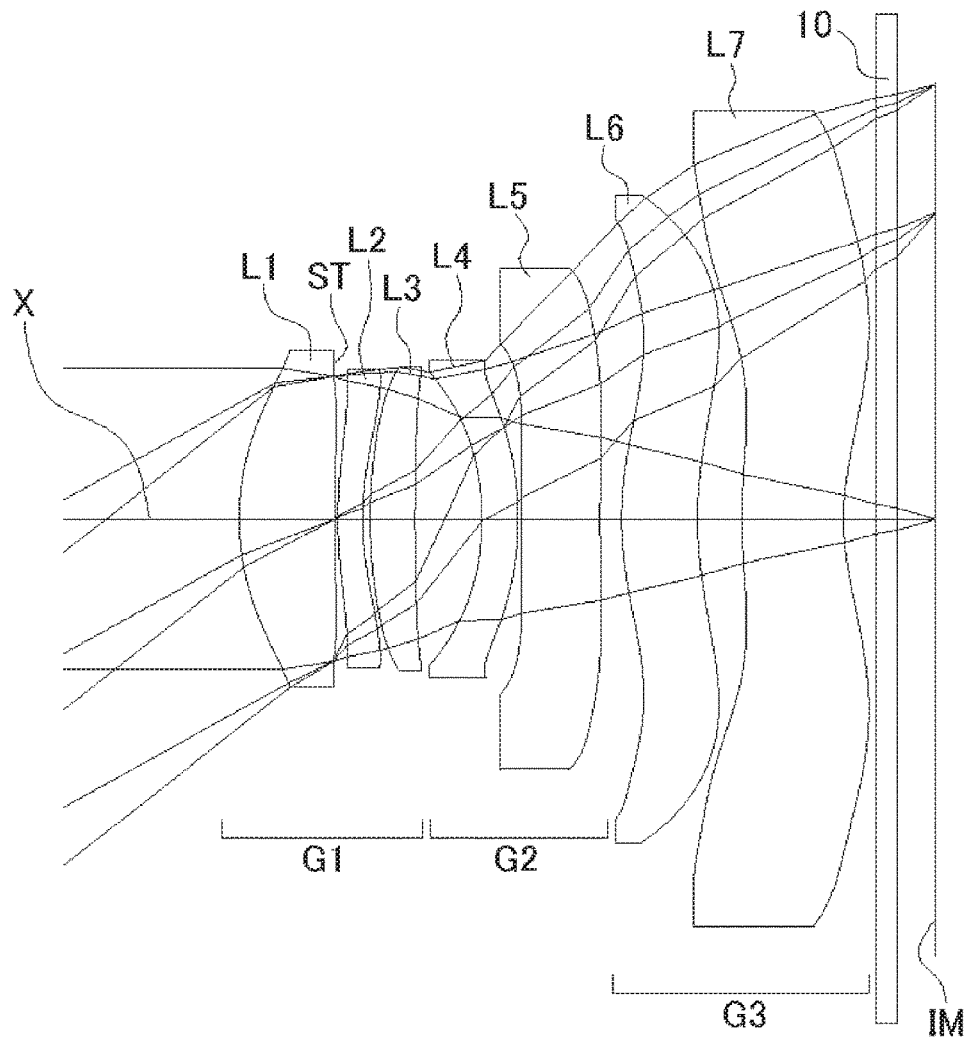
FIG. 10 shows a sectional view of a schematic configuration of an imaging lens in Numerical Data Example 4 according to the embodiment of the present invention.

FIG. 8 shows a lateral aberration that corresponds to the image height ratio H and FIG. 9 shows a spherical aberration (mm), astigmatism (mm), and a distortion (%), respectively, of the imaging lens of Numerical Data Example 3. As shown in FIGS. 8 and 9, according to the imaging lens of Numerical Data Example 3, the aberrations are also satisfactorily corrected.

Numerical Data Example 4

Basic lens data are shown below.

f = 7.60 mm, Fno = 1.8, ω = 38.3°
Unit: mm

Surface Data

| Surface Number i | r | d | nd | vd |
|---|---|---|---|---|
| (Object) | ∞ | ∞ | | |
| 1* | 3.529 | 1.317 | 1.5346 | 56.1 (=vd1) |
| 2* (Stop) | 33.438 | 0.049 | | |
| 3* | 7.726 | 0.342 | 1.6355 | 24.0 (=vd2) |
| 4* | 4.706 | 0.102 | | |
| 5* | 7.886 | 0.619 | 1.5346 | 56.1 (=vd3) |
| 6* | 34.516 | 0.927 | | |
| 7* | −3.697 | 0.503 | 1.6355 | 24.0 (=vd4) |
| 8* | −4.776 | 0.050 | | |
| 9* | 48.982 | 1.083 | 1.6355 | 24.0 (=vd5) |
| 10* | 24.422 | 0.297 (=D56) | | |
| 11* | 4.582 | 1.054 | 1.5346 | 56.1 (=vd6) |
| 12* | 5.774 | 0.608 | | |
| 13* | 7.279 | 1.416 | 1.6355 | 24.0 (=vd7) |
| 14* | 3.697 | 0.440 | | |
| 15 | ∞ | 0.300 | 1.5168 | 64.2 |
| 16 | ∞ | 0.530 | | |
| (Image plane) | ∞ | | | |

Aspheric Surface Data

First Surface k = 0.000, $A_4$ = −2.152E−03, $A_6$ = 1.571E−04, $A_8$ = −1.329E−04, $A_{10}$ = −2.775E−06, $A_{12}$ = −6.955E−07, $A_{14}$ = −9.756E−08, $A_{16}$ = 2.094E−08
Second Surface k = 0.000, $A_4$ = 1.297E−02, $A_6$ = −1.458E−02, $A_8$ = 5.172E−03, $A_{10}$ = −9.133E−04, $A_{12}$ = 5.234E−05, $A_{14}$ = 5.794E−06, $A_{16}$ = −7.303E−07
Third Surface k = 0.000, $A_4$ = 1.428E−02, $A_6$ = −2.060E−02, $A_8$ = 7.409E−03, $A_{10}$ = −1.297E−03, $A_{12}$ = 9.705E−05, $A_{14}$ = 1.548E−06, $A_{16}$ = −5.924E−07
Fourth Surface k = 0.000, $A_4$ = 5.601E−03, $A_6$ = −1.275E−02, $A_8$ = 3.424E−03, $A_{10}$ = −3.521E−04, $A_{12}$ = 1.209E−06, $A_{14}$ = −5.725E−07, $A_{16}$ = 1.186E−07
Fifth Surface k = 0.000, $A_4$ = 6.052E−03, $A_6$ = −3.836E−03, $A_8$ = 1.352E−03, $A_{10}$ = −1.240E−04, $A_{12}$ = −5.950E−07, $A_{14}$ = 9.220E−07, $A_{16}$ = −5.702E−08
Sixth Surface k = 0.000, $A_4$ = −3.130E−03, $A_6$ = 6.224E−04, $A_8$ = 9.555E−04, $A_{10}$ = −3.405E−04, $A_{12}$ = 2.696E−05, $A_{14}$ = 5.073E−06, $A_{16}$ = −9.220E−07
Seventh Surface k = 0.000, $A_4$ = −1.157E−02, $A_6$ = 1.845E−03, $A_8$ = −2.713E−06, $A_{10}$ = −2.778E−05, $A_{12}$ = −1.401E−05, $A_{14}$ = 1.382E−06, $A_{16}$ = 2.677E−07
Eighth Surface k = 0.000, $A_4$ = −1.124E−02, $A_6$ = 2.411E−03, $A_8$ = 9.544E−06, $A_{10}$ = 5.236E−06, $A_{12}$ = −1.552E−06, $A_{14}$ = −1.909E−06, $A_{16}$ = 6.714E−07
Ninth Surface k = 0.000, $A_4$ = −4.523E−03, $A_6$ = −5.470E−04, $A_8$ = 2.810E−05, $A_{10}$ = −1.175E−05, $A_{12}$ = −7.069E−07, $A_{14}$ = 8.915E−08, $A_{16}$ = −1.659E−08
Tenth Surface k = 0.000, $A_4$ = −5.602E−03, $A_6$ = −1.464E−04, $A_8$ = 5.674E−05, $A_{10}$ = −4.007E−06, $A_{12}$ = 2.015E−07, $A_{14}$ = −1.075E−09, $A_{16}$ = −8.115E−10
Eleventh Surface k = 0.000, $A_4$ = −1.161E−02, $A_6$ = 3.886E−05, $A_8$ = 3.992E−06, $A_{10}$ = 5.577E−07, $A_{12}$ = −4.023E−09, $A_{14}$ = 4.113E−10, $A_{16}$ = −9.561E−10
Twelfth Surface k = 0.000, $A_4$ = −5.729E−03, $A_6$ = −3.820E−04, $A_8$ = 3.626E−05, $A_{10}$ = −1.640E−06, $A_{12}$ = 3.512E−08, $A_{14}$ = 8.914E−11, $A_{16}$ = −1.691E−11
Thirteenth Surface k = 0.000, $A_4$ = −2.061E−02, $A_6$ = 1.380E−03, $A_8$ = −3.293E−05, $A_{10}$ = −1.823E−08, $A_{12}$ = 5.235E−09, $A_{14}$ = 1.298E−11, $A_{16}$ = 2.274E−12
Fourteenth Surface k = −7.048, $A_4$ = −8.102E−03, $A_6$ = 4.452E−04, $A_8$ = −1.654E−05, $A_{10}$ = 3.003E−07, $A_{12}$ = 1.157E−08, $A_{14}$ = −6.759E−10, $A_{16}$ = 8.719E−12 f1 = 7.27 mm
f2 = −19.82 mm
f3 = 18.97 mm

19

-continued f = 7.60 mm, Fno = 1.8, ω = 38.3°
Unit: mm f4 = −31.48 mm
f5 = −77.98 mm
f6 = 31.74 mm
f7 = −13.97 mm
f45 = −21.82 mm
f67 = −35.34 mm
f123 = 7.08 mm The values of the respective conditional expressions are as follows:

D56/f = 0.04
f1/f = 0.96
f2/f = −2.61
f3/f = 2.50
f4/f = −4.14
f67/f = −4.65
f45/f6 = −0.69
f123/f = 0.93

Accordingly, the imaging lens of Numerical Data Example 4 satisfies the above-described conditional expressions. The distance on the optical axis X from the object-side surface of the first lens L1 to the image plane IM (length in air for the filter 10) is 9.53 mm, and downsizing of the imaging lens is attained.

Figure 11:
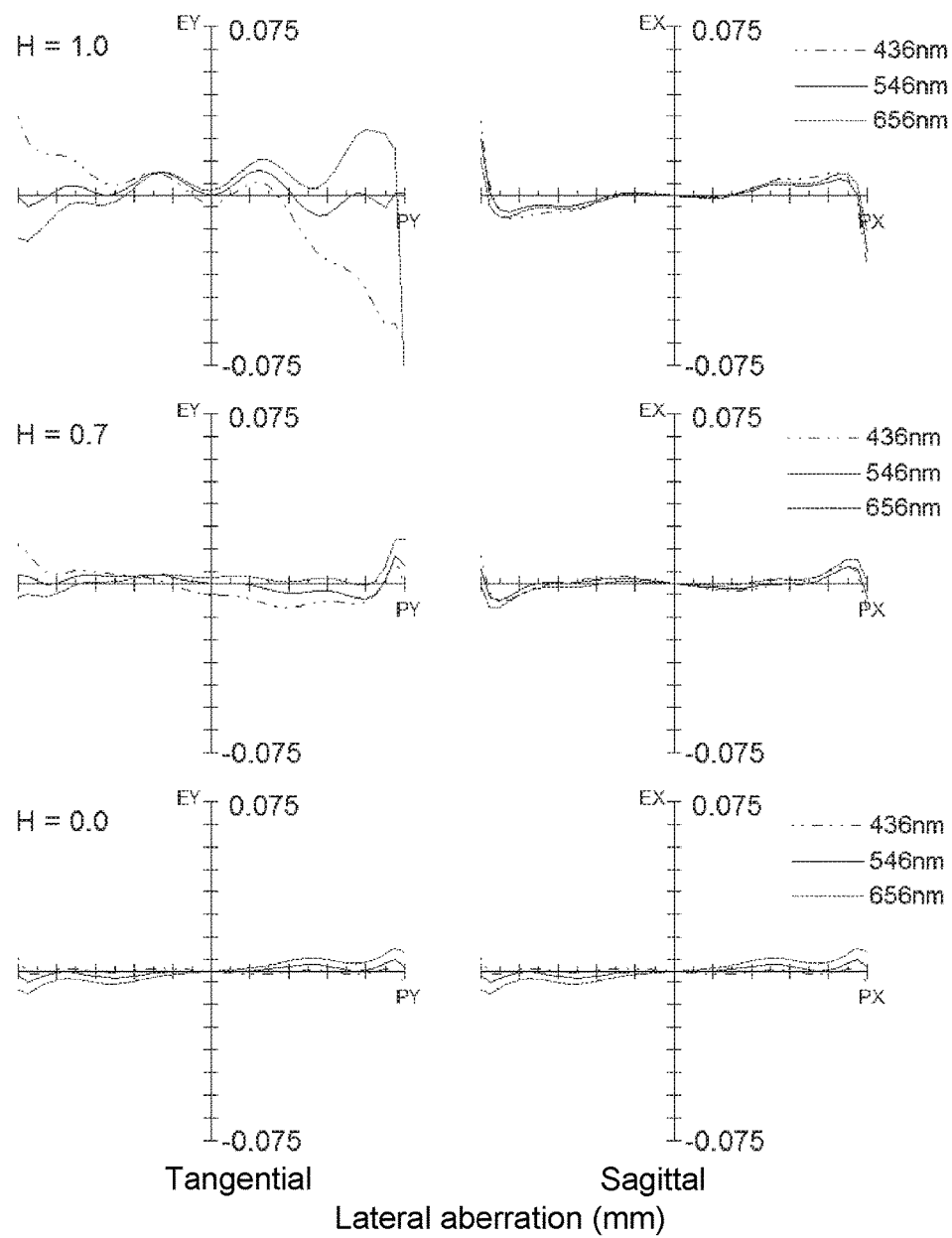
FIG. 11 is an aberration diagram showing a lateral aberration of the imaging lens of FIG. 10.
Figure 12:
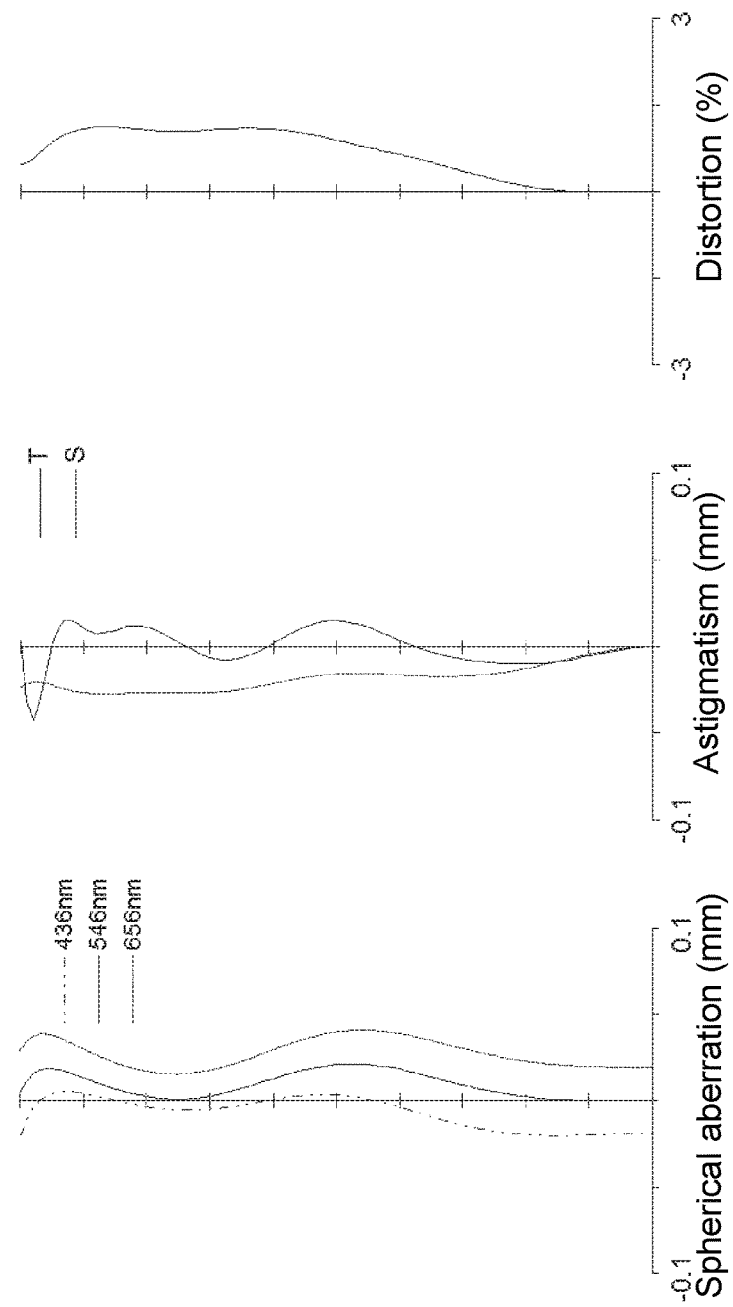
FIG. 12 is an aberration diagram showing a spherical aberration, astigmatism, and a distortion of the imaging lens of FIG. 10.
Figure 13:
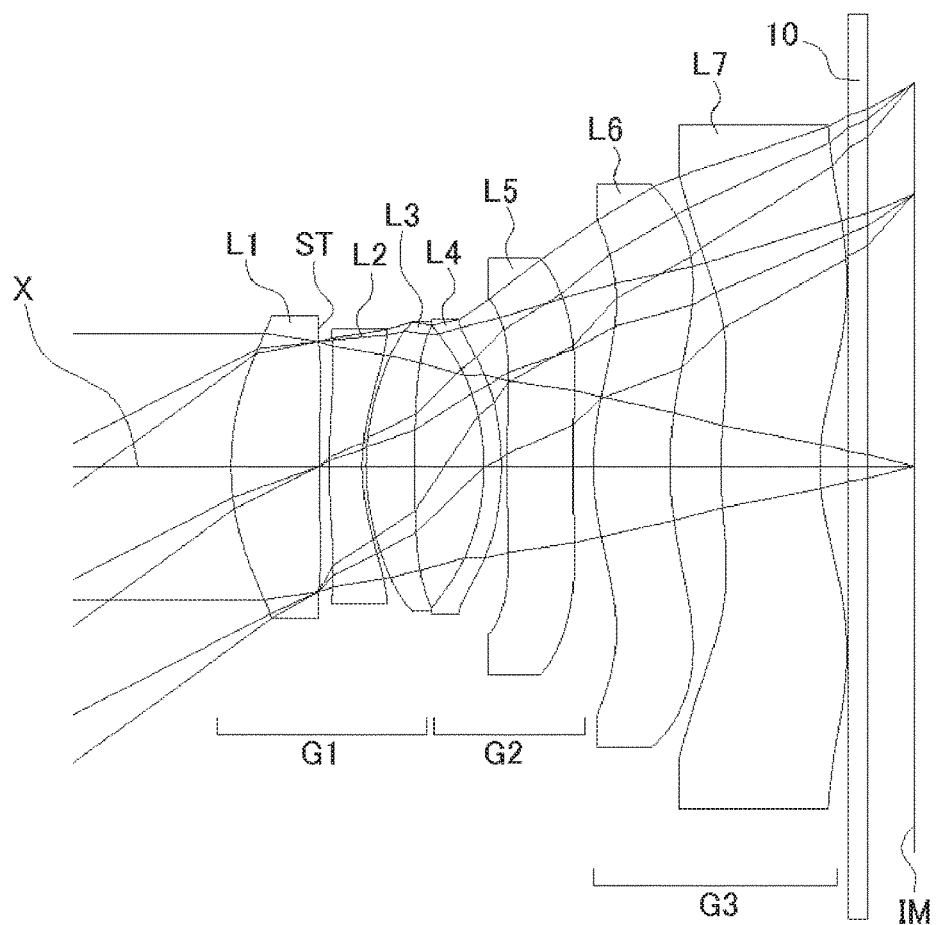
FIG. 13 shows a sectional view of a schematic configuration of an imaging lens in Numerical Data Example 5 according to the embodiment of the present invention.

FIG. 11 shows a lateral aberration that corresponds to the image height ratio H and FIG. 12 shows a spherical aberration (mm), astigmatism (mm), and a distortion (%), respectively, of the imaging lens of Numerical Data Example 4. As shown in FIGS. 11 and 12, according to the imaging lens of Numerical Data Example 4, the aberrations are also satisfactorily corrected.

Numerical Data Example 5

Basic lens data are shown below.

f = 8.23 mm, Fno = 2.0, ω = 36.1°
Unit: mm

Surface Data

| Surface Number i | r | d | nd | vd |
|---|---|---|---|---|
| (Object) | ∞ | ∞ | | |
| 1* | 4.001 | 1.363 | 1.5346 | 56.1 (=vd1) |
| 2* (Stop) | 35.292 | 0.152 | | |
| 3* | 13.633 | 0.509 | 1.6355 | 24.0 (=vd2) |
| 4* | 3.623 | 0.056 | | |
| 5* | 3.901 | 0.750 | 1.5346 | 56.1 (=vd3) |
| 6* | 20.460 | 1.063 | | |
| 7* | −3.905 | 0.285 | 1.6355 | 24.0 (=vd4) |
| 8* | −4.397 | 0.083 | | |
| 9* | 21.531 | 1.014 | 1.6355 | 24.0 (=vd5) |
| 10* | 15.822 | 0.319 (=D56) | | |
| 11* | 4.348 | 1.181 | 1.5346 | 56.1 (=vd6) |
| 12* | 5.641 | 0.781 | | |
| 13* | 6.246 | 1.537 | 1.6355 | 24.0 (=vd7) |
| 14* | 3.481 | 0.440 | | |
| 15 | ∞ | 0.300 | 1.5168 | 64.2 |
| 16 | ∞ | 0.710 | | |
| (Image plane) | ∞ | | | |

20

-continued f = 8.23 mm, Fno = 2.0, ω = 36.1°
Unit: mm

Aspheric Surface Data

First Surface k = 0.000, $A_4$ = −1.574E−03, $A_6$ = 5.572E−05, $A_8$ = −1.146E−04, $A_{10}$ = 4.563E−06, $A_{12}$ = 4.723E−07, $A_{14}$ = −5.047E−08, $A_{16}$ = −1.997E−08

Second Surface k = 0.000, $A_4$ = 1.329E−02, $A_6$ = −1.471E−02, $A_8$ = 5.143E−03, $A_{10}$ = −9.126E−04, $A_{12}$ = 5.367E−05, $A_{14}$ = 6.015E−06, $A_{16}$ = −8.135E−07

Third Surface k = 0.000, $A_4$ = 1.603E−02, $A_6$ = −2.040E−02, $A_8$ = 7.418E−03, $A_{10}$ = −1.305E−03, $A_{12}$ = 9.477E−05, $A_{14}$ = 1.430E−06, $A_{16}$ = −4.258E−07

Fourth Surface k = 0.000, $A_4$ = 4.026E−03, $A_6$ = −1.280E−02, $A_8$ = 3.416E−03, $A_{10}$ = −3.539E−04, $A_{12}$ = 1.335E−06, $A_{14}$ = −3.641E−07, $A_{16}$ = 2.086E−07

Fifth Surface k = 0.000, $A_4$ = 1.803E−03, $A_6$ = −4.300E−03, $A_8$ = 1.320E−03, $A_{10}$ = −1.243E−04, $A_{12}$ = −1.962E−07, $A_{14}$ = 1.021E−06, $A_{16}$ = −3.326E−08

Sixth Surface k = 0.000, $A_4$ = −2.484E−03, $A_6$ = 1.224E−03, $A_8$ = 9.914E−04, $A_{10}$ = −3.372E−04, $A_{12}$ = 2.765E−05, $A_{14}$ = 5.270E−06, $A_{16}$ = −8.886E−07

Seventh Surface k = 0.000, $A_4$ = −1.188E−02, $A_6$ = 1.765E−03, $A_8$ = 1.543E−05, $A_{10}$ = −2.385E−05, $A_{12}$ = −1.347E−05, $A_{14}$ = 1.447E−06, $A_{16}$ = 2.900E−07

Eighth Surface k = 0.000, $A_4$ = −1.309E−02, $A_6$ = 2.037E−03, $A_8$ = −4.695E−05, $A_{10}$ = −5.699E−07, $A_{12}$ = −2.191E−06, $A_{14}$ = −2.017E−06, $A_{16}$ = 6.334E−07

Ninth Surface k = 0.000, $A_4$ = −5.313E−03, $A_6$ = −5.971E−04, $A_8$ = 5.060E−05, $A_{10}$ = −8.367E−06, $A_{12}$ = −2.573E−07, $A_{14}$ = 1.203E−07, $A_{16}$ = −1.622E−08

Tenth Surface k = 0.000, $A_4$ = −8.340E−03, $A_6$ = −1.896E−04, $A_8$ = 5.416E−05, $A_{10}$ = −4.072E−06, $A_{12}$ = 2.098E−07, $A_{14}$ = −2.675E−10, $A_{16}$ = −8.739E−10

Eleventh Surface k = 0.000, $A_4$ = −1.125E−02, $A_6$ = −2.212E−05, $A_8$ = 2.165E−06, $A_{10}$ = 5.092E−07, $A_{12}$ = −5.409E−09, $A_{14}$ = 4.063E−10, $A_{16}$ = −9.054E−11

Twelfth Surface k = 0.000, $A_4$ = −5.146E−03, $A_6$ = −3.399E−04, $A_8$ = 3.516E−05, $A_{10}$ = −1.702E−06, $A_{12}$ = 3.409E−08, $A_{14}$ = 1.156E−10, $A_{16}$ = −1.440E−11

Thirteenth Surface k = 0.000, $A_4$ = −2.129E−02, $A_6$ = 1.361E−03, $A_8$ = −3.313E−05, $A_{10}$ = −1.711E−08, $A_{12}$ = 5.519E−09, $A_{14}$ = 2.890E−11, $A_{16}$ = 3.019E−12

Fourteenth Surface k = −5.675, $A_4$ = −8.164E−03, $A_6$ = 4.582E−04, $A_8$ = −1.680E−05, $A_{10}$ = 2.931E−07, $A_{12}$ = 1.156E−08, $A_{14}$ = −6.697E−10, $A_{16}$ = 9.002E−12 f1 = 8.32 mm
f2 = −7.92 mm
f3 = 8.88 mm
f4 = −70.85 mm
f5 = −100.86 mm
f6 = 26.92 mm
f7 = −15.78 mm
f45 = −40.53 mm
f67 = −83.33 mm
f123 = 9.12 mm

The values of the respective conditional expressions are as follows:

D56/f = 0.04
f1/f = 1.01
f2/f = −0.96

-continued f = 8.23 mm, Fno = 2.0, ω = 36.1°
Unit: mm f3/f = 1.08
f4/f = −8.61
f67/f = −10.13
f45/f6 = −1.51
f123/f = 1.11

Accordingly, the imaging lens of Numerical Data Example 5 satisfies the above-described conditional expressions. The distance on the optical axis X from the object-side surface of the first lens L1 to the image plane IM (length in air for the filter 10) is 10.44 mm, and downsizing of the imaging lens is attained.

Figure 14:
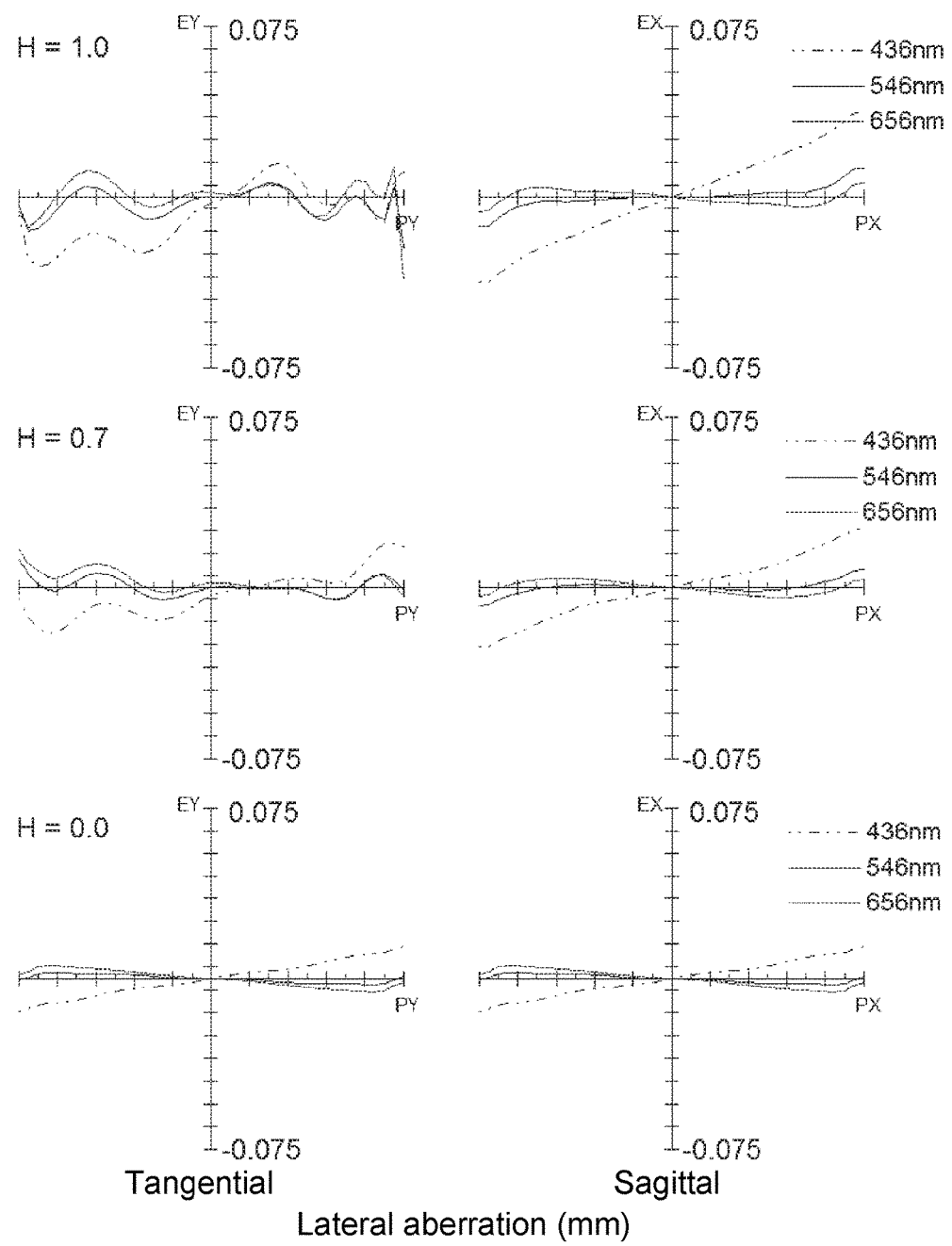
FIG. 14 is an aberration diagram showing a lateral aberration of the imaging lens of FIG. 13.
Figure 15:
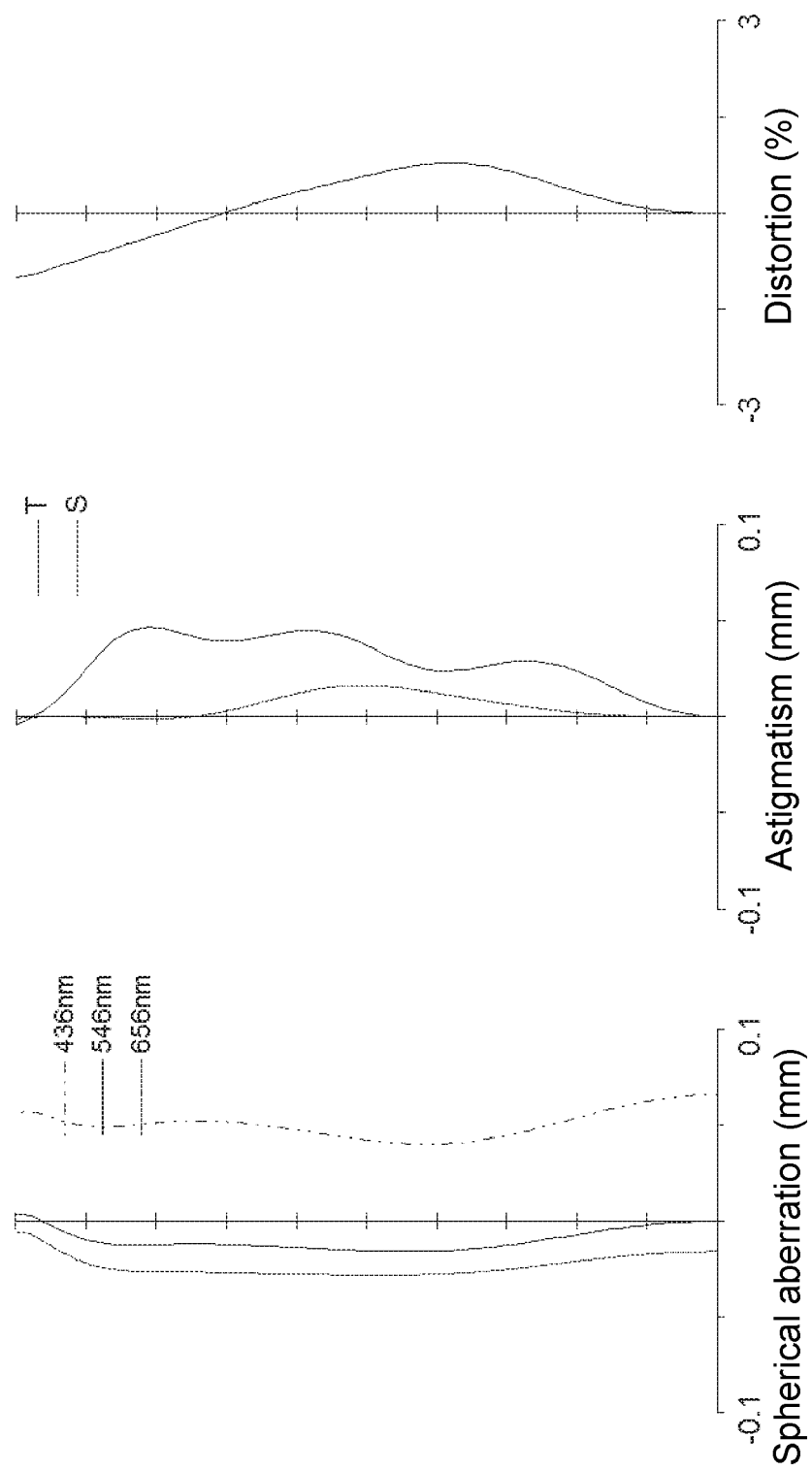
FIG. 15 is an aberration diagram showing a spherical aberration, astigmatism, and a distortion of the imaging lens of FIG. 13.
Figure 16:
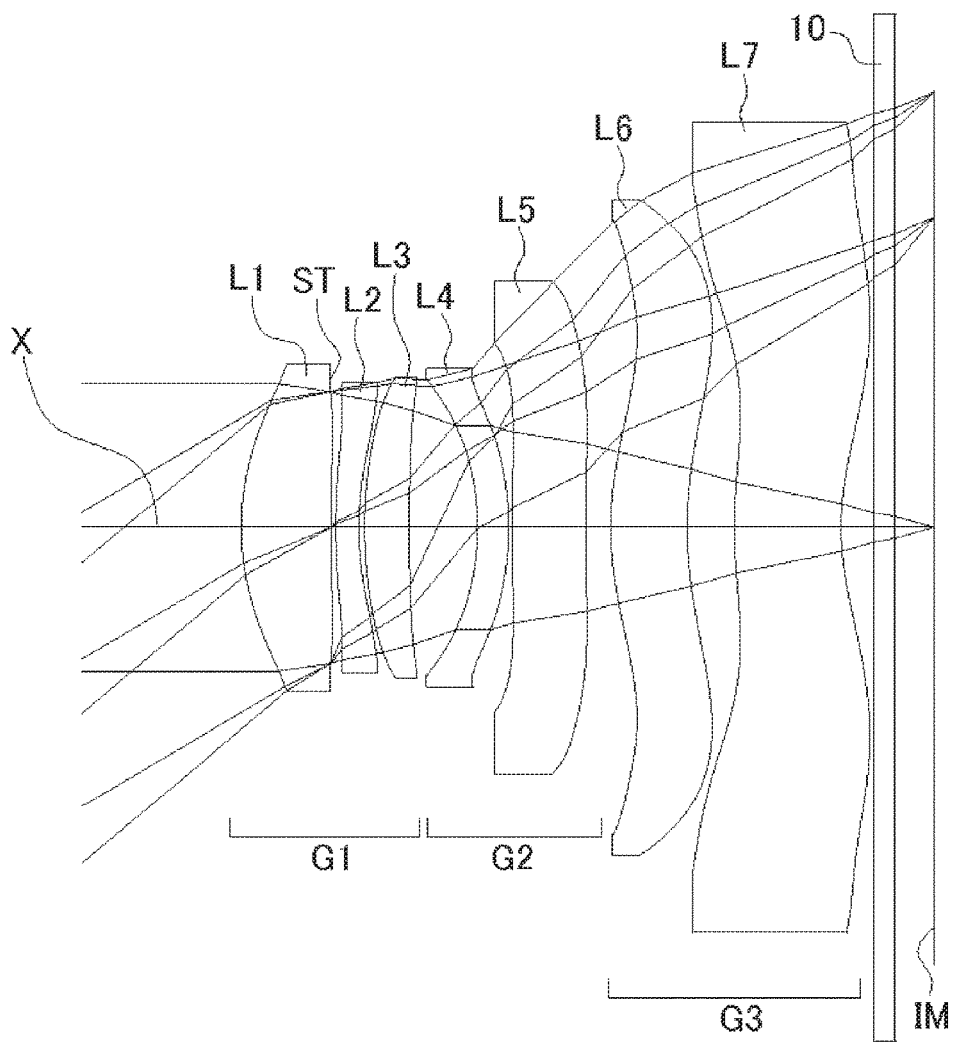
FIG. 16 shows a sectional view of a schematic configuration of an imaging lens in Numerical Data Example 6 according to the embodiment of the present invention.

FIG. 14 shows a lateral aberration that corresponds to the image height ratio H and FIG. 15 shows a spherical aberration (mm), astigmatism (mm), and a distortion (%), respectively, of the imaging lens of Numerical Data Example 5. As shown in FIGS. 14 and 15, according to the imaging lens of Numerical Data Example 5, the aberrations are also satisfactorily corrected.

Numerical Data Example 6

Basic lens data are shown below.

f = 7.13 mm, Fno = 1.8, ω = 40.1°
Unit: mm

Surface Data

| Surface Number i | r | d | nd | vd |
|---|---|---|---|---|
| (Object) | ∞ | ∞ | | |
| 1* | 3.597 | 1.224 | 1.5346 | 56.1 (=vd1) |
| 2* (Stop) | 35.317 | 0.065 | | |
| 3* | 9.798 | 0.314 | 1.6355 | 24.0 (=vd2) |
| 4* | 4.606 | 0.079 | | |
| 5* | 6.480 | 0.608 | 1.5346 | 56.1 (=vd3) |
| 6* | 26.388 | 0.932 | | |
| 7* | −3.825 | 0.433 | 1.6355 | 24.0 (=vd4) |
| 8* | −4.241 | 0.050 | | |
| 9* | 31.262 | 0.996 | 1.6355 | 24.0 (=vd5) |
| 10* | 19.771 | 0.345 (=D56) | | |
| 11* | 4.466 | 1.042 | 1.5346 | 56.1 (=vd6) |
| 12* | 5.654 | 0.641 | | |
| 13* | 6.499 | 1.465 | 1.6355 | 24.0 (=vd7) |
| 14* | 3.706 | 0.440 | | |
| 15 | ∞ | 0.300 | 1.5168 | 64.2 |
| 16 | ∞ | 0.530 | | |
| (Image plane) | ∞ | | | |

Aspheric Surface Data

First Surface k = 0.000, $A_4$ = −2.522E−03, $A_6$ = 1.099E−04, $A_8$ = −1.485E−04, $A_{10}$ = −2.443E−06, $A_{12}$ = −4.628E−07, $A_{14}$ = −5.002E−08, $A_{16}$ = 6.290E−09
Second Surface k = 0.000, $A_4$ = 1.270E−02, $A_6$ = −1.462E−02, $A_8$ = 5.167E−03, $A_{10}$ = −9.139E−04, $A_{12}$ = 5.237E−05, $A_{14}$ = 5.812E−06, $A_{16}$ = −7.369E−07
Third Surface k = 0.000, $A_4$ = 1.492E−02, $A_6$ = −2.053E−02, $A_8$ = 7.421E−03, $A_{10}$ = −1.297E−03, $A_{12}$ = 9.670E−05, $A_{14}$ = 1.396E−06, $A_{16}$ = −6.286E−07
Fourth Surface k = 0.000, $A_4$ = 5.576E−03, $A_6$ = −1.267E−02, $A_8$ = 3.430E−03, $A_{10}$ = −3.536E−04, $A_{12}$ = 6.974E−07, $A_{14}$ = −6.692E−07, $A_{16}$ = 1.037E−07

Fifth Surface k = 0.000, $A_4$ = 5.354E−03, $A_6$ = −3.869E−03, $A_8$ = 1.361E−03, $A_{10}$ = −1.203E−04, $A_{12}$ = −9.243E−08, $A_{14}$ = 9.064E−07, $A_{16}$ = −8.594E−08
Sixth Surface k = 0.000, $A_4$ = −2.753E−03, $A_6$ = 7.228E−04, $A_8$ = 9.740E−04, $A_{10}$ = −3.408E−04, $A_{12}$ = 2.629E−05, $A_{14}$ = 4.900E−06, $A_{16}$ = −9.518E−07
Seventh Surface k = 0.000, $A_4$ = −1.254E−02, $A_6$ = 1.885E−03, $A_8$ = 1.201E−05, $A_{10}$ = −2.526E−05, $A_{12}$ = −1.356E−05, $A_{14}$ = 1.460E−06, $A_{16}$ = 2.920E−07
Eighth Surface k = 0.000, $A_4$ = −1.071E−02, $A_6$ = 2.269E−03, $A_8$ = 9.876E−06, $A_{10}$ = 8.800E−06, $A_{12}$ = −5.499E−07, $A_{14}$ = −1.706E−06, $A_{16}$ = 7.008E−07
Ninth Surface k = 0.000, $A_4$ = −4.373E−03, $A_6$ = −4.920E−04, $A_8$ = 2.796E−05, $A_{10}$ = −7.886E−06, $A_{12}$ = −4.923E−08, $A_{14}$ = 1.211E−07, $A_{16}$ = −2.476E−08
Tenth Surface k = 0.000, $A_4$ = −7.245E−03, $A_6$ = −1.221E−04, $A_8$ = 6.054E−05, $A_{10}$ = −3.833E−06, $A_{12}$ = 2.039E−07, $A_{14}$ = −2.213E−09, $A_{16}$ = −1.144E−09
Eleventh Surface k = 0.000, $A_4$ = −1.069E−02, $A_6$ = −2.733E−06, $A_8$ = 2.429E−06, $A_{10}$ = 5.305E−07, $A_{12}$ = −4.447E−09, $A_{14}$ = 4.514E−10, $A_{16}$ = −8.823E−11
Twelfth Surface k = 0.000, $A_4$ = −5.109E−03, $A_6$ = −3.704E−04, $A_8$ = 3.505E−05, $A_{10}$ = −1.697E−06, $A_{12}$ = 3.443E−08, $A_{14}$ = 1.225E−10, $A_{16}$ = −1.460E−11
Thirteenth Surface k = 0.000, $A_4$ = −2.099E−02, $A_6$ = 1.372E−03, $A_8$ = −3.298E−05, $A_{10}$ = −1.749E−08, $A_{12}$ = 5.423E−09, $A_{14}$ = 1.878E−11, $A_{16}$ = 2.471E−12
Fourteenth Surface k = −5.732, $A_4$ = −8.088E−03, $A_6$ = 4.530E−04, $A_8$ = −1.670E−05, $A_{10}$ = 3.003E−07, $A_{12}$ = 1.169E−08, $A_{14}$ = −6.728E−10, $A_{16}$ = 8.694E−12 f1 = 7.39 mm
f2 = −14.01 mm
f3 = 15.90 mm
f4 = −102.92 mm
f5 = −87.59 mm
f6 = 30.44 mm
f7 = −17.04 mm
f45 = −45.81 mm
f67 = −67.65 mm
f123 = 7.73 mm

The values of the respective conditional expressions are as follows:

D56/f = 0.05
f1/f = 1.04
f2/f = −1.96
f3/f = 2.23
f4/f = −14.43
f67/f = −9.48
f45/f6 = −1.51
f123/f = 1.08

Accordingly, the imaging lens of Numerical Data Example 6 satisfies the above-described conditional expressions. The distance on the optical axis X from the object-side surface of the first lens L1 to the image plane IM (length in air for the filter 10) is 9.36 mm, and downsizing of the imaging lens is attained.

Figure 17:
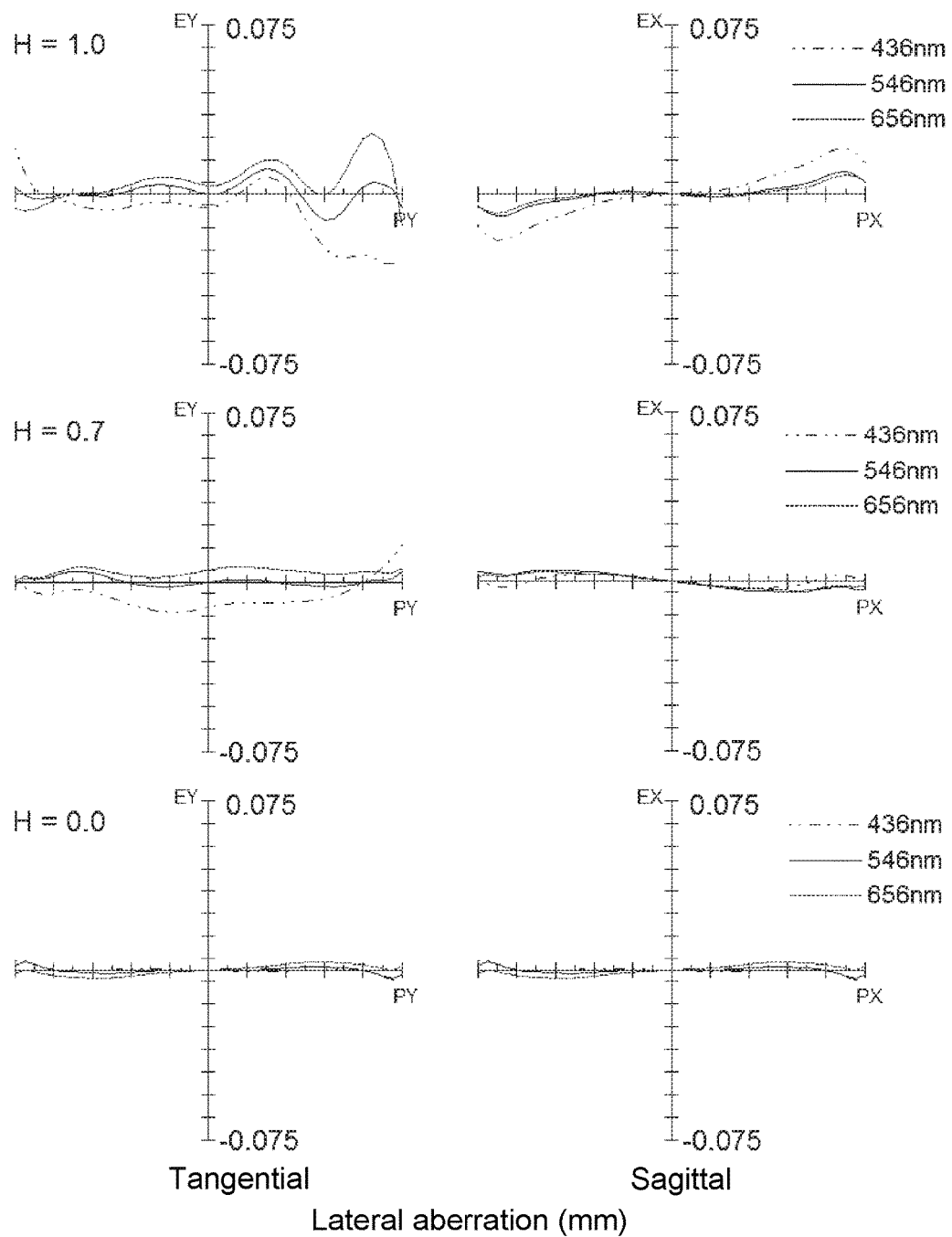
FIG. 17 is an aberration diagram showing a lateral aberration of the imaging lens of FIG. 16.
Figure 18:
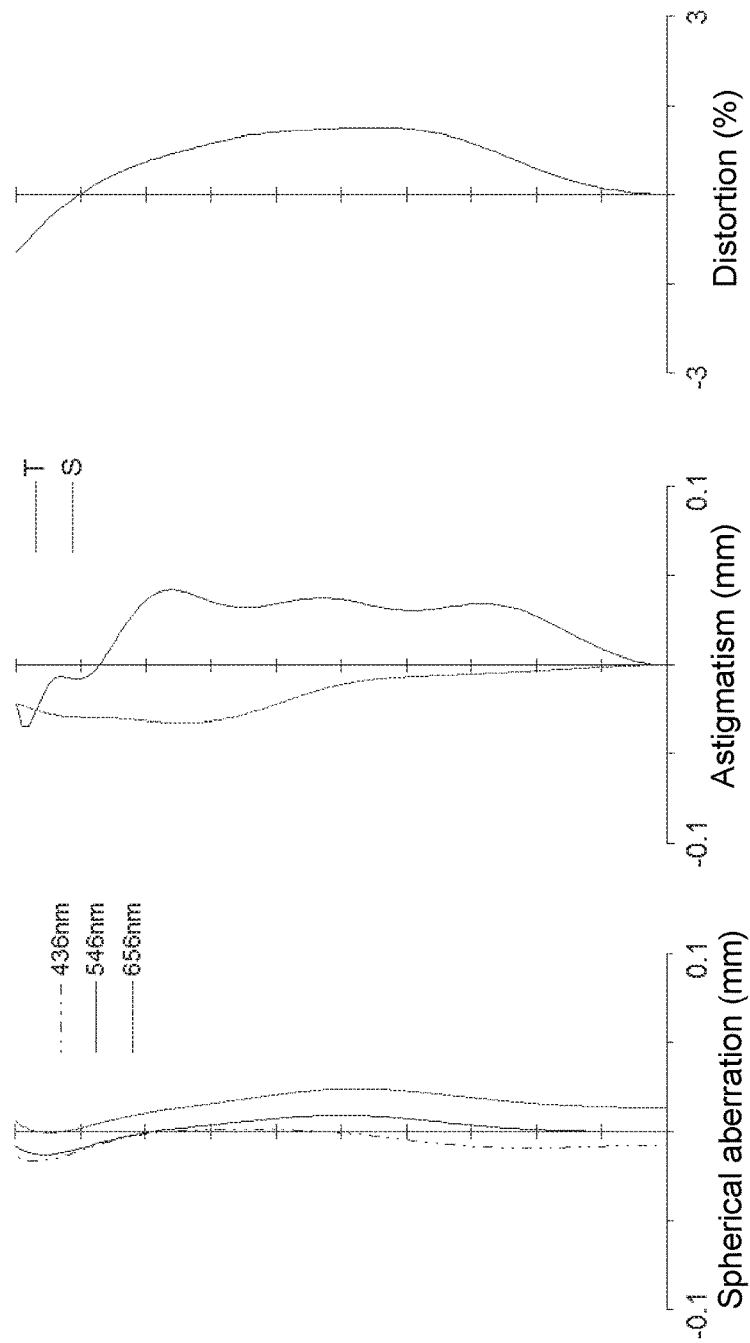
FIG. 18 is an aberration diagram showing a spherical aberration, astigmatism, and a distortion of the imaging lens of FIG. 16.

FIG. 17 shows a lateral aberration that corresponds to the image height ratio H and FIG. 18 shows a spherical aberration (mm), astigmatism (mm), and a distortion (%), respectively, of the imaging lens of Numerical Data Example 6. As shown in FIGS. 17 and 18, according to the imaging lens of Numerical Data Example 6, the aberrations are also satisfactorily corrected.

According to the imaging lens of the embodiment described above, it is achievable to have an angle of view (2ω) that is as wide as 80° or larger. Here, the imaging lenses of the above-described Numerical Data Examples 1 through 6 have angles of view that are as wide as 57.8° to 80.2°. According to the imaging lens of the embodiment, it is possible to take an image over a wider range than that taken by a conventional imaging lens.

Furthermore, in these years, with advancement in digital zoom technology for enlarging any area of an image obtained through an imaging lens by image processing, it becomes more common to use an imaging element having a high pixel count in combination with a high-resolution imaging lens. In case of such a high-pixel count imaging element, a light-receiving area of each pixel is smaller, so that an image taken tends to be dark. As a method to correct this issue, there is a method of improving light-receiving sensitivity of the imaging element using an electrical circuit. However, when the light-receiving sensitivity is increased, a noise component that does not directly contribute to image formation is also amplified, so that it is necessary to use another circuit to reduce the noise. According to the imaging lenses of Numerical Data Examples 1 to 6, Fno is very small, as small as 1.8 to 2.1. According to the imaging lens of the embodiment, it is possible to obtain sufficiently bright images without providing the above-described electrical circuit.

Accordingly, when the imaging lens of the embodiment is applied to an imaging optical system such as a camera for mounting in a portable device including cellular phones, portable information terminals, and smartphones, digital still cameras, security cameras, onboard cameras, and network cameras, it is possible to attain both high performance and downsizing of the cameras.

The present invention is applicable to an imaging lens for mounting in a relatively small-sized camera such as a camera for mounting in a portable device including cellular phones, smartphones, and portable information terminals, digital still cameras, security cameras, onboard cameras, and network cameras.

The disclosure of Japanese Patent Application No. 2014-002858, filed on Jan. 10, 2014, is incorporated in the application by reference.

While the present invention has been explained with reference to the specific embodiment of the present invention, the explanation is illustrative and the present invention is limited only by the appended claims.

What is claimed is:
1. An imaging lens comprising:
a first lens group;
a second lens group; and
a third lens group, arranged in this order from an object side to an image plane side,
wherein said first lens group includes a first lens having positive refractive power, a second lens having negative refractive power, and a third lens,
said second lens group includes a fourth lens and a fifth lens,
said third lens group includes a sixth lens and a seventh lens, said seventh lens having negative refractive power,
said fourth lens has a concave surface facing the object side near an optical axis thereof,
said seventh lens has an image plane-side surface formed in an aspheric shape having at least one inflexion point, and
said fifth lens is disposed away from the sixth lens by a distance D56 on an optical axis thereof, said first lens has an Abbe's number vd1, said second lens has an Abbe's number vd2, and said third lens has an Abbe's number vd3 so that the following conditional expressions are satisfied:

$0.04 \leq D56/f < 0.15$, $40 < vd1 < 75$, $20 < vd2 < 35$, $40 < vd3 < 75$, where f is a focal length of a whole lens system.

2. The imaging lens according to claim 1, wherein said fourth lens has negative refractive power, and
said fifth lens has negative refractive power.

3. The imaging lens according to claim 1, wherein said fourth lens has an Abbe's number vd4 and said fifth lens has an Abbe's number vd5 so that the following conditional expressions are satisfied:

$20 < vd4 < 35$ $20 < vd5 < 35$.

4. The imaging lens according to claim 1, wherein said sixth lens has an Abbe's number vd6 and said seventh lens has an Abbe's number vd7 so that the following conditional expressions are satisfied:

$40 < vd6 < 75$ $20 < vd7 < 35$.

5. The imaging lens according to claim 1, wherein said second lens has a focal length f2 so that the following conditional expression is satisfied:

$-4 < f2/f < -0.5$.

6. The imaging lens according to claim 1, wherein said third lens has a focal length f3 so that the following conditional expression is satisfied:

$1 < f3/f < 5$.

7. The imaging lens according to claim 1, wherein said fourth lens has a focal length f4 so that the following conditional expression is satisfied:

$-15 < f4/f < -3$.

8. The imaging lens according to claim 1, wherein said sixth lens and said seventh lens have a composite focal length f67 so that the following conditional expression is satisfied:

$-15 < f67/f < -1.5$.

9. The imaging lens according to claim 1, wherein said sixth lens has a focal length f6, and said fourth lens and said fifth lens have a composite focal length f45 so that the following conditional expression is satisfied:

$-2 < f45/f6 < -0.1$.

10. An imaging lens comprising:
a first lens group;
a second lens group; and
a third lens group, arranged in this order from an object side to an image plane side, wherein said first lens group includes a first lens having positive refractive power, a second lens having negative refractive power, and a third lens, said second lens group includes a fourth lens and a fifth lens, said third lens group includes a sixth lens and a seventh lens, said seventh lens having negative refractive power, said third lens is formed in a meniscus shape so that a surface thereof on the object side is convex near an optical axis thereof, said fourth lens has a concave surface facing the object side near an optical axis thereof, said seventh lens has an image plane-side surface formed in an aspheric shape having at least one inflexion point, said first lens has an Abbe's number vd1, said second lens has an Abbe's number vd2, and said third lens has an Abbe's number vd3 so that the following conditional expressions are satisfied:

$40 < vd1 < 75$, $20 < vd2 < 35$, $40 < vd3 < 75$, and said fourth lens has a focal length f4 so that the following conditional expression is satisfied:

$-15 < f4/f < -3$ where f is a focal length of a whole lens system.

11. The imaging lens according to claim 10, wherein said fourth lens has negative refractive power, and
said fifth lens has negative refractive power.

12. The imaging lens according to claim 10, wherein said fourth lens has an Abbe's number vd4 and said fifth lens has an Abbe's number vd5 so that the following conditional expressions are satisfied:

$20 < vd4 < 35$ $20 < vd5 < 35$.

13. The imaging lens according to claim 10, wherein said sixth lens has an Abbe's number vd6 and said seventh lens has an Abbe's number vd7 so that the following conditional expressions are satisfied:

$40 < vd6 < 75$ $20 < vd7 < 35$.

14. The imaging lens according to claim 10, wherein said fifth lens is disposed away from the sixth lens by a distance D56 on an optical axis thereof so that the following conditional expression is satisfied:

$0.02 < D56/f < 0.15$, where f is a focal length of a whole lens system.

15. The imaging lens according to claim 10, wherein said second lens has a focal length f2 so that the following conditional expression is satisfied:

$-4 < f2/f < -0.5$ where f is a focal length of a whole lens system.

16. The imaging lens according to claim 10, wherein said third lens has a focal length f3 so that the following conditional expression is satisfied:

$1 < f3/f < 5$ where f is a focal length of a whole lens system.

17. The imaging lens according to claim 10, wherein said sixth lens and said seventh lens have a composite focal length f67 so that the following conditional expression is satisfied:

$-15 < f67/f < -1.5$ where f is a focal length of a whole lens system.

18. The imaging lens according to claim 10, wherein said sixth lens has a focal length f6, and said fourth lens and said fifth lens have a composite focal length f45 so that the following conditional expression is satisfied:

$-2 < f45/f6 < -0.1$.

* * * * *